(12) United States Patent
Kohavi et al.

(10) Patent No.: US 9,129,018 B2
(45) Date of Patent: Sep. 8, 2015

(54) CHANGING RESULTS AFTER BACK BUTTON USE OR DUPLICATE REQUEST

(75) Inventors: Ron Kohavi, Issaquah, WA (US); Ya Xu, Mountain View, CA (US); Noor-E-Gagan Singh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 459 days.

(21) Appl. No.: 13/451,884

(22) Filed: Apr. 20, 2012

(65) Prior Publication Data
US 2013/0282683 A1 Oct. 24, 2013

(51) Int. Cl.
*G06F 17/30* (2006.01)

(52) U.S. Cl.
CPC .... *G06F 17/30864* (2013.01); *G06F 17/30873* (2013.01)

(58) Field of Classification Search
CPC .................. G06F 17/30873; G06F 17/30554; G06F 17/30861
USPC .......... 707/706, 722; 715/760, 841, 854, 205, 715/207, 234, 273
See application file for complete search history.

(56) References Cited

U.S. PATENT DOCUMENTS

| | | | |
|---|---|---|---|
| 5,911,145 A * | 6/1999 | Arora et al. | 715/207 |
| 6,978,445 B2 | 12/2005 | Laane | |
| 2006/0282790 A1 * | 12/2006 | Matthews et al. | 715/767 |
| 2007/0266025 A1 | 11/2007 | Wagner et al. | |
| 2009/0138438 A1 | 5/2009 | Wilson | |
| 2010/0082610 A1 | 4/2010 | Anick et al. | |
| 2010/0100836 A1 | 4/2010 | Corella et al. | |
| 2011/0047136 A1 | 2/2011 | Dehn | |
| 2011/0060737 A1 | 3/2011 | Cardella | |
| 2011/0202522 A1 | 8/2011 | Ciemiewicz et al. | |
| 2011/0238992 A1 | 9/2011 | Jancula et al. | |
| 2011/0264644 A1 | 10/2011 | Grant et al. | |
| 2011/0301835 A1 * | 12/2011 | Bongiorno | 701/201 |
| 2013/0066853 A1 * | 3/2013 | Andersson et al. | 707/722 |

OTHER PUBLICATIONS

"User-agent Flow Needs A Rewrite", Retrieved on: Apr. 3, 2012, Available at: http://answerpot.com/showthread.php?651334-user-agent+flow+needs+a+rewrite.
"Search Results", Retrieved on: Apr. 3, 2012, Available at: http://mednar.com/mednar/help.html#searchResults.

* cited by examiner

*Primary Examiner* — Cheryl Lewis
(74) *Attorney, Agent, or Firm* — Dave Ream; Peter Taylor; Micky Minhas

(57) ABSTRACT

Enhancements of the user experience are provided when a user returns to a previously viewed page, such as a previously viewed page of search results. When a user returns to a previously viewed page, additional context information from a user's actions since the initial view of a page can be used to modify the previously viewed page and/or obtain a new version of the previously viewed page. In situations where the previously viewed page corresponds to a page of responsive results from a search engine, the modified and/or new version of the search engine results page can include an expanded or reduced group of results, different types of results, different rankings for existing results, or a combination thereof.

20 Claims, 15 Drawing Sheets

CHANGING RESULTS AFTER BACK BUTTON USE OR DUPLICATE REQUEST

BACKGROUND

One of the common tasks performed using a browser application is to submit a query to a search engine. This results in a search engine generating a page of search engine results. A typical format for the search engine results page is to include a listing of links to responsive documents (such as about 10 links), along with zero or more advertisements. Additional portions of the results page may include suggested alternate queries and links to view additional results pages that contain links for results that received a lower ranking from the search engine. Although a snippet from each responsive result may be displayed as part of the results, a user typically must interact with each link in some way in order to get more detail about the true relevance of the result for the user.

SUMMARY

In various embodiments, methods are provided for enhancing the user experience when a user uses the Back button or other submits a duplicate request. When a user uses a Back button or submits a duplicate request, additional context information can be used to modify the previously viewed page and/or obtain a new version of the previously viewed page. In situations where the previously viewed page corresponds to a page of responsive results from a search engine, the modified and/or new version of the search engine results page can include an expanded or reduced group of results, different results, different and/or additional types of results such as including image or multimedia results in a modified page when the original page contained only links to text documents, different rankings for existing results, or a combination thereof.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
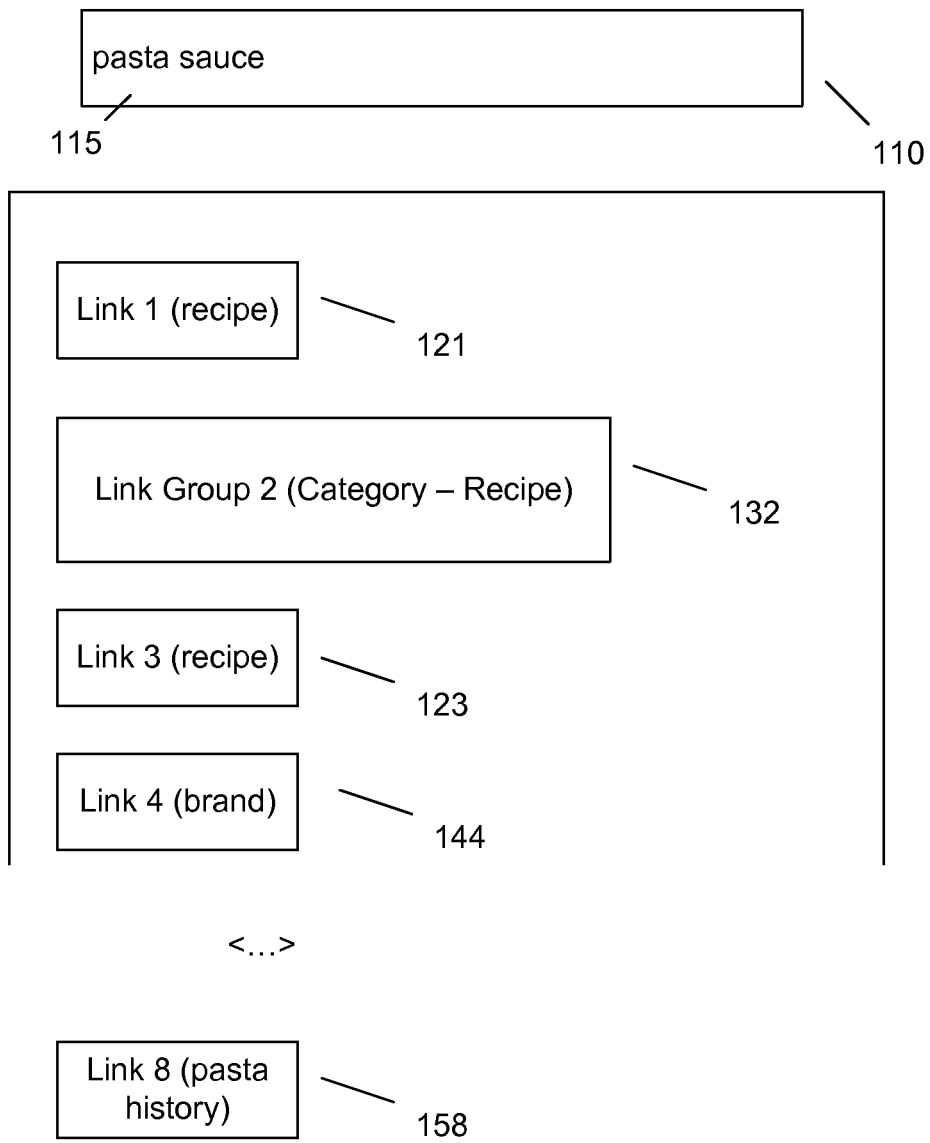
FIGS. 1 to 5 show schematic examples of the display of search engine result pages.

When the Back button is used in a conventional browser to return to a previous entry in the history for a browsing session, the browser will serve the user a cached version of the appropriate page. Serving a cached version of the page allows for faster display of the previously viewed page. However, no update is performed to the information displayed on the page. When the previously viewed page is a results page from a search engine, the user is provided with the same number and type of results that were initially displayed on the results page, and the results are also displayed in the original display order or format.

In various embodiments, systems and methods are provided for enhancing the user experience during review of results from a search engine. Initially, a query is submitted to a search engine to generate a page of results from the search engine. The query can be submitted by the user, or the query can be automatically generated, or the query can be submitted by any other convenient method. The page of results from the search engine can include, for example, links to responsive documents, advertisements, suggested queries, deeplinks, and/or link groups for responsive links sharing a common feature, such as a link group of links within a category or link group of image or other multimedia links. The user then moves to another page. For example, the user can move to another page by clicking on or otherwise selecting one of the links displayed on the results page. As another example, the user can submit a second search query using a query box on the initial results page, which causes a new results page to be displayed based on the second search query. The user then uses the back button or types the initial query again. Instead of serving the cached version of the results page, a new results page is created for display to the user. A new results page can be generated by submitting the query to the search engine again. When the query is submitted again to the search engine, the search engine can take into consideration a temporary context based on any user activity and/or lack of activity during the time between when the user first viewed the results page for the initial query and when the user attempted to return to the results page corresponding to the query. By avoiding use of a cached version of the results page, the types and/or quantity of results displayed to the user can be modified. This can include changing various aspects of a results page, including but not limited to changing the results that are considered responsive, changing the types of additional results provided such as sponsored links or advertisements, query suggestions, query answers, or multimedia results, and/or changing the quantity of one or more types of results. New user interface elements can also be included, such as including a collapsed set of results. Additionally or alternately, the results page created for display to the user can be modified based on user activity between the initial and subsequent viewing. Such modifications can include, but are not limited to, modifying the order of display or arrangement of links or other results, removing links, or removing types of results.

Another benefit of avoiding use of a cached version of a page is related to capturing all portions of a page for display. Some types of web pages contain multiple types of content that is displayed in parallel. For example, a search engine results page typically contains a primary content type of links to results that are responsive to a submitted search query. The links to responsive results are often provided as "blue links" on a results page. When a user submits a search query, the display of the search engine results page will be delayed until the links to responsive results are available for display.

A search engine results page can also include several other types of content for display. These additional types of content can include advertisements, suggested alternative search queries, query answers, image or multimedia results, and other types of content. The preparation of these additional content types can be performed in parallel when a query is submitted. Depending on the search engine, one or more of these additional content types may be optional for display. If the preparation of an optional content type is not completed sufficiently quickly, such as prior to reaching a threshold time value, the results page will be displayed to the user without the incomplete content type. Thus, if an advertisement for a results page is not prepared sufficiently quickly, the results page can be displayed without the advertisement. If a cached version of a web page is used when the user uses the Back button or re-submits the query, the optional content type will still be missing. By avoiding use of the cached version of the page and submitting the query to the search engine again, an opportunity is provided to allow the missing content to be added to the page. Since the Back button or re-submission of the query will often occur near in time to the original submission of a query, the context information related to the query may still be held in memory, allowing for faster processing of the additional content types. More generally, any type of page containing optional content types can benefit from avoiding the use of a cached page.

Still another option is to modify the appearance of a results page based on user interaction (or lack of interaction) with the results. For example, when a user does not interact with the one or more of the top ranked results on a page, the user's lack of interaction with the higher ranked results can indicate that the results are less relevant. When a user selects the back button and/or re-submits a query, the display of the results page can be modified to account for the user's lack of interaction with the higher ranked results. As one example, a user can submit a search query of the word "apple" to a search engine. In the search engine results page, the first result or first plurality of results may correspond to computer-related results, while one or more lower ranked results may correspond to information about a type of fruit. In this example, the first link selected by a user corresponds to one of the results corresponding to apple as a fruit. The selection by the user demonstrates an interest in one of several meanings for the search term apple, which can be used to disambiguate the query. When the user returns to the results page, such as by using the Back button, a modified results page can be displayed to the user that reflects this additional context.

Use of a Back Button or Re-Submission of a Search

A browser as defined herein refers to any software or user agent that is used to locate, retrieve, and display content, such as content from a wide area network. Content available from web sites with URL addresses that start with "www" is an example of content from a wide area network, although a browser may be used to locate, retrieve, and display content from other public and private wide area networks. Optionally, content from storage locations on a local storage device and/or content found on a local area network may also be accessible using a browser.

Browsers often have history mechanisms, such as "Back" buttons and history lists, which can be used to redisplay a page retrieved earlier in a session. History mechanisms are typically distinct from the cache used by a browser to temporarily store information. In particular, history mechanisms (such as history mechanisms for browsers that are compliant with W3C standards) conventionally try to show a semantically transparent view of the current state of a resource. In other words, a history mechanism is meant to show exactly what the user saw at the time when the resource was retrieved. By default, an expiration time does not apply to history mechanisms. If the entity is still in storage, a conventional history mechanism will display it even if the entity has expired, unless the user has specifically configured the agent to refresh expired history documents.

By contrast, a cache mechanism for a browser provides temporary storage of previously viewed pages. Although a cache mechanism can be used to serve a version of a page as it initially appeared to a user, various settings can be used to alter how a browser uses information stored in a cache. For example, many browsers have an optional "no-cache" directive that can be used by a server that delivers a page to a browser to change how information is retrieved from a browser cache. If the no-cache directive is used without specifying a field name in association with a page delivered to a browser, such a directive instructs the browser to not use the cached page to satisfy a subsequent request without successful revalidation with the origin server. This allows an origin server to prevent caching even by caches that have been configured to return stale responses to client requests.

If the no-cache directive does specify one or more field-names, then the version of the page stored in cache may be used to satisfy a subsequent request, subject to any other restrictions on caching. However, such a directive instructs the browser to not use the specified field-name(s) in the response to a subsequent request without successful revalidation with the origin server. This allows an origin server to prevent the re-use of certain header fields in a response, while still allowing caching of the rest of the response. It is noted that the above behavior in response to the no-cache directive may not be recognized by older browsers, such as browsers implementing an HTTP/1.0 version of a cache.

Another directive that can be used when interacting with a browser is a "no-store" directive. The purpose of the no-store directive is to prevent the inadvertent release or retention of sensitive information (for example, on backup tapes). The no-store directive applies to the entire message, and may be sent either in a response or in a request. If sent in a request, a cache is instructed to not store any part of either this request or any response to it. If sent in a response, a cache is instructed to not store any part of either this response or the request that elicited it. This directive applies to both non-shared and shared caches. In the context of a no-store directive, the browser cache is instructed to not intentionally store the information in non-volatile storage. The browser cache is further instructed to make a best-effort attempt to remove the information from volatile storage as promptly as possible after forwarding it. It is noted that even when a no-store directive is associated with a response, users might explicitly store such a response outside of the caching system (e.g., with a "Save As" dialog). History buffers may store such responses as part of their normal operation.

The purpose of a no-store directive is to meet the stated requirements of certain users and service authors who are concerned about accidental releases of information via unanticipated accesses to cache data structures. While the use of this directive might improve privacy in some cases, it is typically not a reliable or sufficient mechanism for ensuring privacy. In particular, malicious or compromised caches might not recognize or obey this directive, and communications networks might be vulnerable to eavesdropping.

When a user returns to a previously viewed results page using a Back button, a conventional browser will return a cached version of the results page. If it is desired to provide a modified page instead of a cached page, a number of options are available. One option is to use the "no-store" option of a browser. For browsers that include this option, the "no-store" option prevents a browser from storing cached versions of pages. Thus, in order to display a results page again, the browser is forced to resubmit the corresponding search query.

The "no-cache" option may provide a similar effect, but the operation of the "no-cache" option varies depending on the type of browser.

Still another option is to use a JavaScript applet or another type of additional program. A JavaScript applet or other program can be used to perform additional functions and/or replace the function of a Back button. This can allow for customized behavior when a Back button is used to traverse the history for a browsing session.

As an alternative to using a Back button, a user can also return to a previously viewed page by entering the URL for the previously viewed page into the address bar. Depending on the settings for the browser, entering the URL for a previously viewed search engine results page could result in a new search being performed, or a cached version of the page could be returned. In a search context, still another alternative to using a back button is for a user to explicitly submit a query again.

Types of User Interactions

A search engine results page can be generated based on a query from any convenient source. The query can be submitted by the user, the query can be automatically generated, or the query can represent a modified version of a query provided by a user. Regardless of the source of the query, submitting the query to a search engine results in display of a search engine results page.

In various aspects, a search engine results page can have a variety of formats. The format selected can vary depending on the nature of the query and whether the user has previously viewed the results page. Variations in the format can include variations in how many links to responsive documents are provided as well as variations in how many alternative types of results are provided such as query suggestions, advertisements and/or sponsored links, image or other multimedia results, and other types of content.

In addition to query suggestions, multimedia content, and sponsored links, another type of result is a deeplink result. When the top level page at a domain is identified as responsive to a query, a number of pages below the top level page may also be highly ranked. One method for providing links to these multiple pages in a convenient manner is to use a deeplink format. When a deeplink is provided, a link is provided as a primary link to a page at a domain. Often this primary link will correspond to the top level page, such as main home page for a university, a corporation, or a commercial web site. In addition to the primary link, a plurality of links to lower level pages can also be provided, to allow a user to select a more specific page from a domain without having to visit the top level page. For example, a deeplink for a university could use the main home page (such as www.<university>.edu) as the primary link. Additional links to the pages for the admissions office, the athletic department, and the bursar can then be displayed below and/or near the primary link. This allows a larger number of responsive results to be provided related to a single domain while occupying only one slot on the search engine results page. Thus, using the university example above, rather than having four of the ten links displayed on the search engine results page correspond to a single domain, only one deeplink is displayed for the university that contains the four links described above along with nine additional responsive results.

Still another type of responsive result is a link group. A link group can be used to provide links to a plurality of responsive results within a category. One use for a link group is in display of links for multimedia results, such as images. A link for the category of images related to <search query> can be provided as a primary link for a link group. A plurality of individual images within the category can be displayed below (or otherwise near) the primary link. Another example of a category is a category for a type of recipe, such as recipes for soup or pasta. Still another example of a category is a commerce or shopping category, where a primary link can be "shopping results for <search query>", and additional links are provided for items available within the shopping category that are responsive to the search query. Still other examples of a link group can also be constructed in an analogous manner.

Yet another type of result is a result that allows a user to access content that is no longer available on a modified results page. For example, the initial selection of a responsive result may result in disambiguation of a query. When the user returns to the results page, all of the results on the modified results page may correspond to an entity, category, or domain that matches the initial selection. If the initial selection was made in error by the user, the user may desire to display the original responsive results. A link can be included on a modified results page to allow a user to display the original results listing. When this type of link is used, for example, the search query can be submitted again, but without the temporary context from the current browsing session.

When a search engine results page of any convenient format is displayed to a user, the interactions of the user with the results page can be captured and used to provide additional information regarding what the user considers as matching and/or relevant results for the search query. If desired, such tracking of the interactions of the user can be implemented after receiving the consent of the user. Such consent may also allow the user to select types of tracking that are desired or not desired. In the discussion below, reference will be made to using a mouse or a mouse pointer to interact with links or other portions of a page or browser. However, any other convenient type of user interaction can also be used and/or tracked. For example, selection of a Back button or a link could be performed by touching a touch interface with a stylus or finger, using gesture input, using a voice command to indicate a portion of the display for selection, or by any other convenient method.

Several types of user activities are related to how a user interacts with the responsive results. User interactions can refer both to activity by a user to interact with a link or subject matter as well as a lack of interaction by a user with a link or subject matter. As an initial example of how lack of interaction can be captured, a user may desire to receive some type of sports information from the fictitious web site TheNewsSite.com. A user submits an initial search query, such as "thenewssite sports." This results in display of a first search engine results page. The user may or may not interact with one of the results on the first results page. The user then submits a second search query of "thenewssite sports mlb." This results in display of a second search engine results page. Without interacting with any of the results, or optionally after interacting with a result for less than a threshold or "quickback" period of time, the user selects the back button. The user's return to the initial results page without interaction (or possibly after a short interaction) is an indication that the results on the second results page were not of interest. This can allow, for example, for decreasing the ranking of any results that were in common between the first and second results pages in order to allow for display of other potentially relevant results. Alternatively, any results in common between the first and second results pages can be captured as part of a collapsed link, so that all of the common results count as only one displayed result on the page. This again provides more room for display of other potentially matching results, while still allowing the user to access the results in common between the first and second pages if desired.

As another example of lack of interaction, a search engine results page may include a listing of links to responsive results. These links can be listed in an order based on a ranking of the responsive results, such as a ranking provided by the search engine. The first link selected by a user on a results page can be used as an indication of the relevance of the corresponding responsive result. For example, the link for the first responsive result selected by a user may correspond to the sixth link in the order of listing on the results page. This indicates that the user did not find the first five responsive results in the listing to be relevant based on the title and/or snippet provided for the link. This lack of interaction can be used to provide a different display format for subsequent visits to the results page by the user. When the user returns to this results page, such as by using the back button, the first five links can be displayed in a manner that conserves space. For example, this can include providing a link that takes the user to a separate page for viewing the first five links, or the first five links can be provided as a condensed link for expansion by the user if desired. By reducing the number of result slots occupied by the first five links, additional potentially responsive links can be made available in the same amount of space.

Another way the first user selection of a link can be used is based on any categories, entities, or other subject matter associated with a link. One example of using subject matter associated with a link is in situations where a query generates responsive results corresponding to multiple entities. For example, a query including "UW" as a keyword could return responsive results based on universities in Wisconsin, Washington, or Wyoming. The first user interaction with the responsive results can provide an indication of which university corresponds to the user's intent. In other words, the first user interaction with the responsive results can be used for disambiguation of a query that generates responsive results corresponding to more than one entity.

More generally, the first user selection of a link can be used to distinguish between multiple entities, subject matter categories, or other types of subject matter. For example, a search query of "pasta sauce" can return some responsive results in a category related to recipes (such as a food or home improvement category) while other responsive results are in a category related to companies that sell pasta sauces in grocery stores (such as a business or commerce category). In this situation, even though the meaning of the keywords "pasta sauce" is clear, the responsive results displayed on the first page of the search engine results correspond to two different subject matter categories. The first user interaction with a result can be used to determine the category of interest to the user. In addition to categories and entities, other document or page features can be considered for inferring user intent, such as the domain of a responsive result.

In addition to or as an alternative to tracking user activity in the form of clicking on a displayed link, interaction with a link by hovering over or near the link may also be tracked. For example, if the search engine provides additional information regarding a responsive result when a mouse pointer is moved over or near the corresponding link, such hovering activity may also indicate user interest (or a lack thereof).

Another situation where the first user interaction with a result is important is for queries that are considered navigational queries. For example, many users access social media sites by first using a search engine to provide a link to an entry point for the site. Thus, if the name of a social media site is entered as a search query, unless further context is available, the most likely user intent is that the user intends to access the social media site. This type of query can be referred to as a navigational query, as there is a responsive result to the query that clearly has the highest ranking under the ranking procedure used by the search engine. Another example of a navigational query is a query containing a tracking number with a format that matches the format for a major commercial carrier.

While a navigational query will have a single responsive result that is the expected intent of a user submitting a search query, it is possible that a user will have a different intent. The name of a social media web site, for example, is often also the name of the parent corporation that manages the site. Thus, a search query corresponding to the name of the social media site will often indicate an interest in accessing the social media site, but it could also indicate an interest in the corporate parent. If a user presents a navigational query but does not select the first listing, this likely indicates that the user did not intend to navigate to the expected responsive result corresponding to the navigational query, and therefore other responsive results should be presented to the user.

Still another type of user interaction is the amount of time that a user spends reviewing a responsive result. After selecting a link, the responsive document or page corresponding to the link is displayed to the user. The length of time the user spends interacting with a responsive document or page can indicate the relevance of the result for the user. For example, if a user that interacts with a document or page for less than a threshold period of time, the user interaction time likely indicates that the document or page did not match the user's interest. Similarly, interaction for longer periods of time can indicate increasing interest by the user. The interest by the user can be captured based on viewing of the responsive document or page for time periods that are longer than one or more thresholds, or the interest can be measured on a proportional scale. More generally, user interactions with multiple results from a search engine results page can be tracked to further determine the user intent associated with a query. Examples of threshold times for viewing a page in order to determine a user's interest in the subject matter can be about 10 seconds, or about 20 seconds, or about 30 seconds, or about 45 seconds. For example, a user that views a responsive result for 10 seconds or less can be considered to have a low interest in the result, leading to a reduced ranking when the user returns to the search engine results page. By contrast, if the user views another result for 30 seconds or more, the corresponding result can have an increased ranking when the user returns to the results page. Additionally, any other responsive results that share common ranking features with the selected and viewed results can also have modified rankings.

Modification of Previously Viewed Documents (Breaking the Browser Cache)

After a user leaves an initial page, such as a page of search results, the user can return to the page by using the Back button or optionally by re-entering the search query, such as by entering the query in a search box or selecting the query from a list of previously used queries. Instead of serving a cached version of the results page, however, a modified version of the results page can be displayed. The modified version of the results page can be modified based on the tracked user interactions (or lack of interactions) prior to the user's return to the initial page.

One potential modification is to not use a cached version of the search engine results page (or other type of page). Instead, when the user uses the back button or enters a query again, the query is submitted to the search engine. Submitting a new query to the search engine allows any tracked interactions since the initial viewing of the results page (such as one or more tracked interactions) to be used as additional context for providing an updated results page. This context can either be used by the search engine to modify the search, or the context can be used to make modifications at the browser level.

The tracked interactions can be incorporated into a new search engine results page in a variety of ways. One option is to incorporate the tracked interactions as additional features that are used in ranking potentially responsive results. The tracked interactions can be captured, for example, by using temporary user context variables that are used only during a current browsing session. Based on tracked user interactions, the ranking for a potential responsive result can be increased or decreased. Optionally, a potential responsive result may be excluded entirely based on the additional context information. For example, if the tracked interactions demonstrate user interest in a category, entity, or other subject matter, any potential responsive results that do not match the user interest could be excluded from display in the new results page.

Another option is to submit the query to the search engine so that a different number and/or type of responsive results can be displayed on a results page. For example, the initial search engine results page can have a greater or lesser number of responsive results displayed on the page relative to the results page for the query submitted after the user returns to the results page. As another example, a plurality of results that were displayed during the initial viewing can be displayed in a condensed format, such as by providing a link to a separate page or by providing a collapsed display of the results that the user can expand if desired. Additionally, one or more types of results can be added or removed from the results page, such as adding or removing suggested queries, sponsored results links, deeplinks, images or other multimedia responsive results, or link groups corresponding to a subject matter category.

Still another option is to use the tracked interactions to modify the search query prior to submission to the search engine. The search query can be modified by adding keywords, adding metadata to the query not visible to the user but recognized by the search engine, or in any other convenient manner.

With regard to the number of links (or link groups) for responsive documents or pages, an initial search engine results page can include 3 or less links (or link groups), or 5 or less, or 8 or less. Alternatively, the initial search engine results page can include at least 10 links (or link groups), or at least 12 links, or at least 15 links. A modified search engine results page generated after a user traverses the browsing session history to return to the results page can include 3 or less links (or link groups), or 5 or less, or 8 or less. Alternatively, the modified search engine results page can include at least 10 links (or link groups), or at least 12 links, or at least 15 links.

For example, the initial search engine results page can include a reduced number of links (or link groups) to responsive documents or pages, such as 8 links or less or 5 links or less. Optionally, an initial search engine results page can be limited to displaying only links as opposed to displaying both links and link groups. After a user interacts with one of the links, the user traverses the browsing history to return to the results page. When the query is submitted again, a modified results page is created with additional results such as a results page including 10 links or more, or 12 links or more. Optionally, the modified results page can include both links and link groups. Additionally, other types of results can also be provided that were not provided on the initial results page, such as suggested alternative queries, deeplinks, or sponsored links. By presenting a reduced number of links initially, the highest ranked results can be presented quickly to a user. After a user interacts with at least one responsive document, the additional context information can be used to provide a larger set of responsive documents with a greater confidence that the documents are responsive to the user's current intent.

In addition to the above or as an alternative to the above, the results page can be modified without submitting a query to the search engine. In this situation, when the user traverses the history to return to the search engine results page, the tracked interaction information is used by a local application (such as the browser) to modify the page for display to the user. Such modifications can be applied to a newly obtained search engine results page or to a cached version of the results page as initially viewed by the user.

Refreshing Pages with Missing Content

In addition to the above methods, breaking the browser cache can also be useful for allowing pages with incomplete content to be provided in complete form when a user returns to the page. While this applies to search engine result pages, this can also be used for any type of page where the page includes primary content and additional content.

The primary content for a page is defined as content where the page is not delivered for display to a browser and/or where the browser does not display the page unless the primary content is provided. When a page is requested form a server, such as a search engine server, the server may select a format for the content of the page. This format can include at least one type of primary content. The format may also include additional content types that the server would like to provide, but that are not essential to delivery of the requested page. For example, when a search engine receives a query, the links to responsive results are considered primary content for the search engine. The search engine will not deliver a page for display back to a browser without the links to responsive results.

By contrast, one or more additional content types may also be provided by the search engine, but only if the additional content types are generated fast enough to be included. Examples of additional content types include sponsored links, suggested queries, and query answers. For these additional content types, if generation of the results corresponding to the content type is delayed, the search engine will deliver a results page to the browser that simply omits the content type. Typically, the additional content types will have an associated threshold time for generation of the additional content. If content for an additional content type is not generated within the threshold time, the page is delivered without that additional content type. The threshold time can be any convenient value, such as 300 milliseconds or less, or 500 milliseconds or less, or 1 second or less.

Although a server may fail to generate an additional content type within the required threshold time, the attempt to generate the content will typically leave at least a portion of the data for generating the additional content type present in a cache memory or other local memory. If the same page is requested again from the same browser, the necessary information for generating the additional content type will already be available. This allows the additional content type to be generated more quickly during the second attempt.

When a page is delivered to a browser that excludes an additional content type, the server delivering the page can optionally identify the page to the browser as having a missing content type. This can be an explicit identification that a content type is missing, or it can represent an indirect identification, such as by delivering the page to the browser with the "no-cache" directive. By identifying the page as having missing content, the browser will respond to a request to view the page again by returning to the server to obtain the missing content and/or a modified results page containing the missing content.

Example

Search Engine Results Page for a Navigational Query

In this prophetic example, a user submits a specialized or navigational query, where the intent of a typical user is to identify a specific web site. In this hypothetical example, the specialized query is "arbitrary meetings", which is a navigational query for the fictional social networking site "arbitrarymeetings.com." It is noted that at the time of drafting of this document, the above domain was not registered.

In this example, the user enters the query "arbitrary meetings." Due to the popularity of the corresponding (fictional) social networking site, the entry page for "arbitrarymeetings.com" receives a sufficiently high ranking value to identify the query as a navigational or otherwise specialized query. As a result, a search engine results page is displayed to the user containing a small plurality of links corresponding to responsive results, such as 3 or less links or 5 or less links. In the discussion below, three links are described as being initially displayed. In order to improve response time, the results page does not include suggested queries. Also, no deeplinks or link groups are included in the responsive results. The first displayed (i.e., highest ranked) link corresponds to the entry page for "arbitrarymeetings.com." The second displayed link corresponds to a web based information or encyclopedia site that describes the corporation named "arbitrary meetings." The third displayed link corresponds to a page from a human rights organization web site regarding laws the restrict freedom of assembly in various countries. The results page also includes one advertisement for a company that offers games that can be played using the social networking site as an interface.

When the results page is displayed, the user selects a link other than the expected selection of the entry page for "arbitrarymeetings.com." After reviewing the responsive result corresponding to the selected link, the user uses the Back button (or re-enters the query "arbitrary meetings") to return to the initial search engine results page. In this example, this results in the query of "arbitrary meetings" being submitted again. In response, a modified (expanded) search engine results page is created. The modified results page includes at least 10 links to responsive documents, such as at least 12. The entry page for "arbitrarymeetings.com" is still displayed as one of the links on the results page, but it is not necessarily the highest ranked link. The ranking of the entry page for "arbitrarymeetings.com" is reduced relative to the ranking on the initial results page based on the selection of a different link by the user on the initial results page. The expanded results now also include additional responsive results, such as documents or pages about various local government meetings where the term "arbitrary" appears in the minutes.

In addition to expanding the number of responsive results, additional types of information are also displayed by including several query suggestions as part of the results page. Also, based on the additional information that the user is not interested in the entry page for "arbitrarymeetings.com," no advertisement appears on the modified results page, as the keywords have little independent advertising value apart from the social networking site.

Example

User Interaction with Lower Ranked Results

In this prophetic example, a user submits the query "pasta sauce" to a search engine. In response, a search engine results page is displayed to the user that contains 8 or less links (or link groups) to responsive documents or pages. In this particular example, 8 links (or link groups) to responsive pages are returned. In addition to links to responsive documents, a plurality of suggested alternative queries as well as a plurality of paid or sponsored links for grocery retailers and commercial pasta sauce brands are displayed.

FIG. 1 schematically shows a possible layout for the search engine results page. On the search engine results page, a query box 110 containing the current query 115 of "pasta sauce" is at the top of the results page. The responsive results are presented below the query box 110. The second listing 132 for a responsive result is a link group or category link for the category "recipes—pasta sauces". In addition to a primary link to the recipe category, this link group includes links and corresponding images for a plurality of recipes available in the category. As described above, all of the links related to the primary link for the recipe category are counted as a single "link group" in the 8 links or link groups. For the remaining links, the first link 121, third link 123, and the fifth and sixth links (not explicitly shown) are links to pages or documents containing recipes. The fourth link 144 and seventh link (not shown) are links to pages for commercially available pasta sauce brands. The eighth link 158 is a link to a page containing information about the history of pasta.

After the search engine results page is displayed to the user, the user selects the fourth link, corresponding to a page describing a commercial pasta sauce. By selecting the fourth link as the initial link to view, the user has indicated a preference for information about commercial brands, as opposed to recipes for making pasta sauce. The user then uses the Back button (or re-enters the query "pasta sauce") to return to the search engine results page. Rather than displaying the cached version of the page, a new query is submitted to the search engine.

Figure 2A:
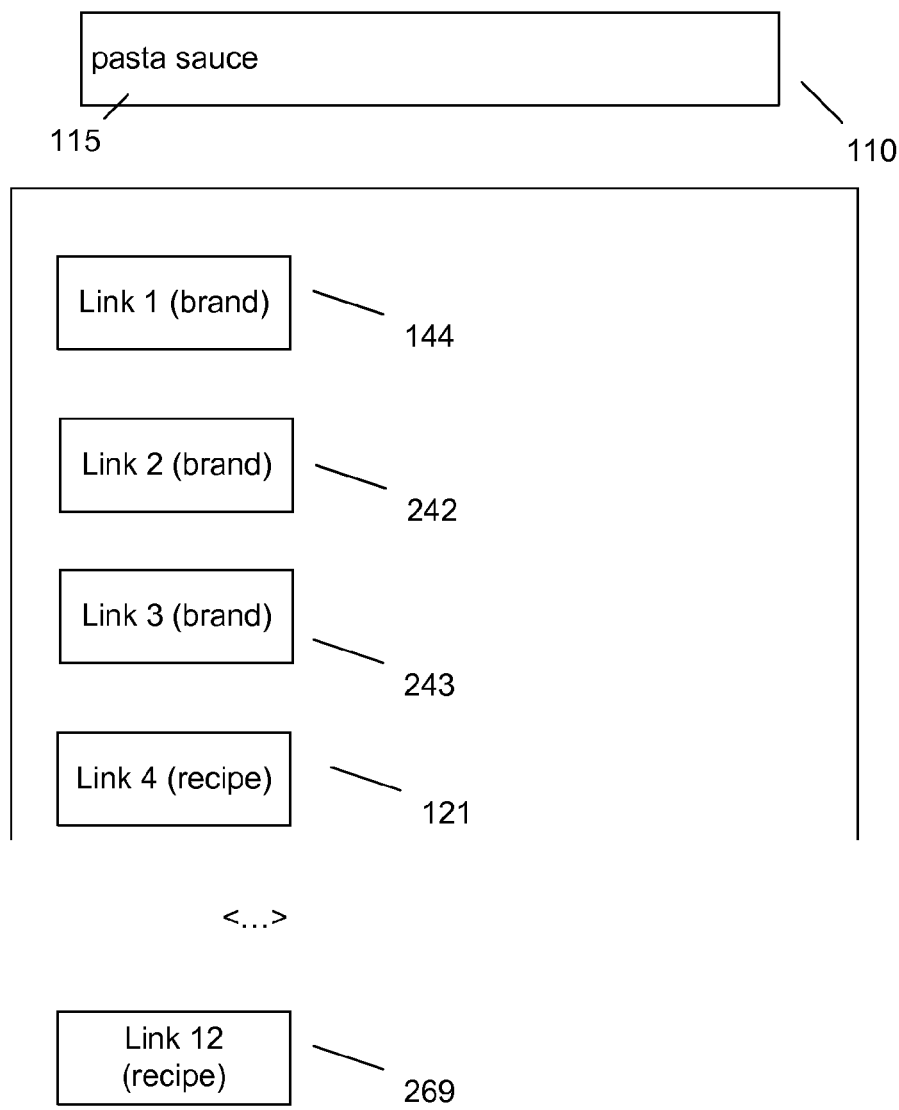

FIG. 2A shows one example of how the user interacting initially with the fourth result can be used when the user returns to the results page. In the example in FIG. 2A, when the query is submitted to the search engine again, the query is accompanied by a temporary user context of a ranking preference increase for the category of commerce sites and a ranking preference decrease for the category of recipes. This results in a modified (new) search engine results page, which is schematically shown in FIG. 2A. The new search engine results page includes query box 110 with query 115 of "pasta sauce". The new search engine results page also includes 12 links or link groups for responsive pages. Due to the temporary user context, sites corresponding to commercially available pasta sauces occupy the first three link positions. This includes the first link 144, corresponding to the responsive result that was initially selected, as well as additional commercial links 242 and 243. The fourth position is the link 121 to the recipe site that occupied the first position in the initial results page. The remaining links correspond to additional commercial sauce sites, recipe sites, and the pasta history page. The category link for "recipes—pasta sauce" no longer appears, since the user has indicated a preference for a different category. The types of advertisements remain the same, however, as the temperature context did not change the interest level of advertisers for the keywords "pasta sauce."

Figure 2B:
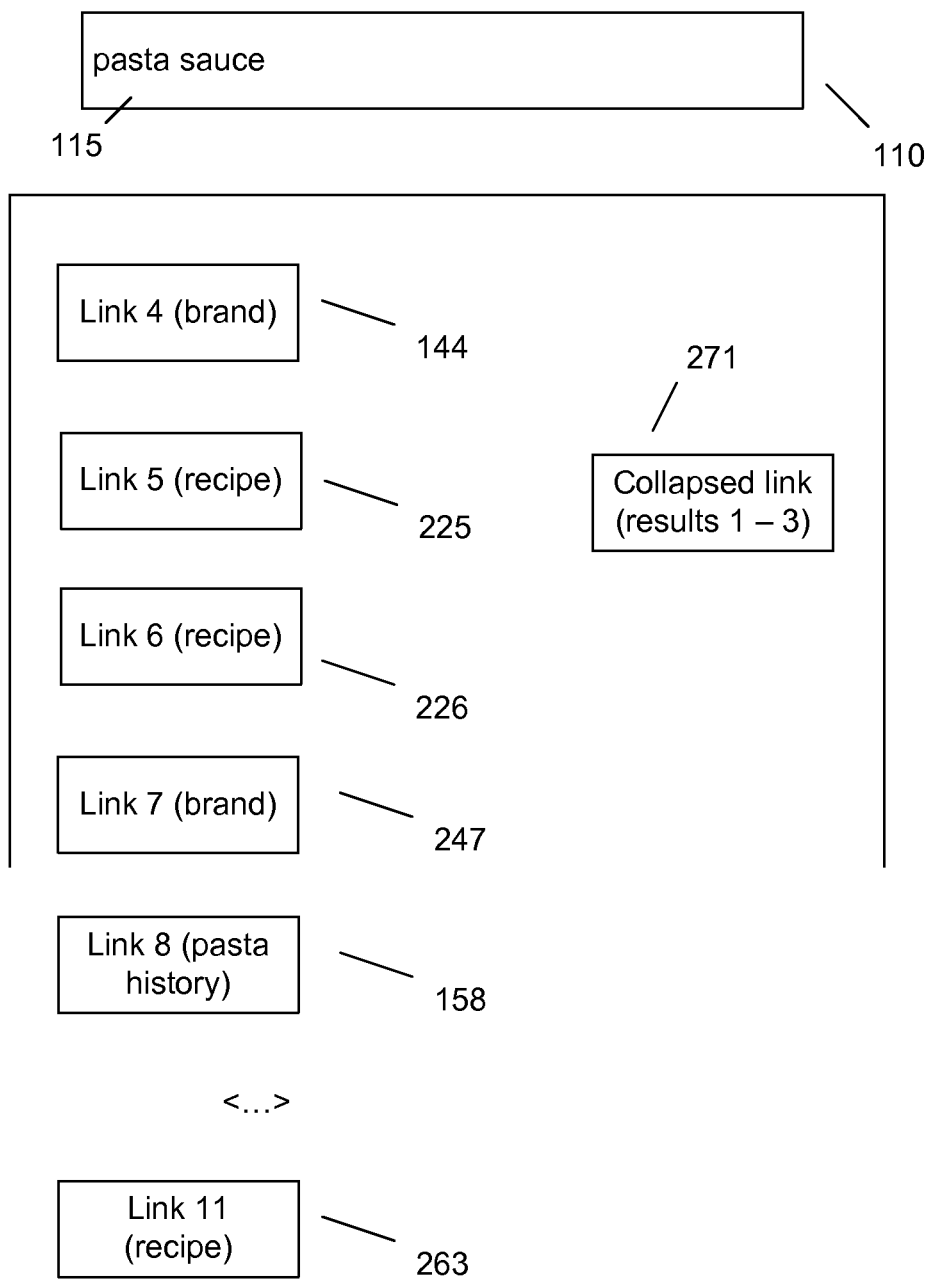

FIG. 2B shows an alternative example of how the user's lack of interaction with the first 3 results can be used to modify the results page when the user returns to the results page. In this example, the ranking of results is not modified. Instead, the lack of user interaction with the first three results is used to identify the first three results as being of low interest. In FIG. 2B, these first three results are presented as a collapsed link 271 to the right of the main listing of responsive results. The user can expand this collapsed link to view links 121, 132, and 123 (corresponding to links 1-3) from FIG. 1. More generally, any number of results passed over by the user during the initial viewing of a search engine results page can be placed in the collapsed link. Because the first three results were placed in the collapsed link, the main listing of responsive results now starts with link 144 that was link 4 from FIG. 1 (the link initially selected by the user). Similarly, link 5 that was initially displayed to the user is now second link 225, link 6 is now third link 226, link 7 is now fourth link 247, and link 8 from FIG. 1 is now fifth link 158. In this example, the same number of results are displayed on the modified page as were shown on the initial page. As a result, links 9 and 10 (not shown) and link 11 (corresponding to link 263) are added to the end of the listing of results.

In a variation on FIG. 2B, the collapsed link 271 for links 1-3 can be included in the main listing of results. As another variation, the methods used in the examples for FIGS. 2A and 2B can be combined. For example, the initial three results corresponding to links 1-3 could be included in a collapsed link, while the remaining results were ranked again based on the additional temporary context, resulting in a different display order for the results.

Example

Disambiguation

In this prophetic example, a user submits the query "jaguar" to a search engine. In response, a search engine results page is displayed to the user that contains 10 or less links (or link groups) corresponding to responsive documents or pages. In this particular example, 10 links (or link groups) to responsive results are returned. Part of the reason for selecting 10 links as opposed to a lesser number in this example is due to the ambiguous nature of the query. Providing additional links allows for display of additional links from two unrelated categories, so that a link corresponding to the intent of the user is more likely to be displayed on the initial results page. Alternatively, a smaller number of links such as 8 or less or 5 or less could be displayed in order to improve the speed of display of the initial results page.

The links are divided between sites related to cars or car dealerships and sites related to information about the large feline predator known as a jaguar. A category link group is included as the third link for a commercial shopping site that sells automobiles. The category link group also includes links and corresponding images for a plurality of cars that are responsive to the query. Another category link group corresponding to images responsive to "jaguar" is included as the seventh entry in the listing of links. The image category link group includes images of both cars and feline predators.

When the search engine results page is displayed, the user clicks on one of the links related to cars. After viewing the page corresponding to the selected link, the user traverses the history to return to the results page. In this example, the query is not submitted again to the search engine. Instead, the results page is modified locally to reflect the user's interest in cars rather than feline predators. The modified results page includes 8 links or link groups. Based on the user's selection of a link related to automobiles, the unrelated links for feline predators are not displayed directly. Instead, a link is provided that allows the user to display the original listing of results. The link group for the commercial shopping site is still placed in the third entry position. The link group of images is also included in the listing, but only the images of cars are included. Optionally, a modified ranking of the various listings could be generated locally based on the additional temporary context from the tracked user interactions.

Example

Addition of Deeplinks

In this prophetic example, a user submits the query "UW admissions" to a search engine. In response, a search engine results page is displayed that includes 8 or fewer links, such as 6 links. The results page includes results for universities located in Wisconsin, Washington, and Wyoming. After displaying the results page, the user selects one of the results related to the University of Washington. After viewing the corresponding page for a period of time, the user traverses the history to return to the results page.

The results page is modified by submitting the query again to the search engine, with entity "Washington" included as part of the search query. Alternatively, the entity information of Washington could be included as a temporary context, with the original query submitted again to the search engine. A modified (new) search engine results page is returned by the search engine. The modified results page includes responsive results based on "Washington" being relevant to the search. A link is also provided to allow the user to return to the original results page. The modified results page includes 12 or more links on the results page. The first link or link group corresponds to the site for the University of Washington. This is presented in a "deeplink" format, where various sites within the domain for the University of Washington are also accessible via links from the results page.

Example

Multiple User Interactions with a Document

Figure 3:
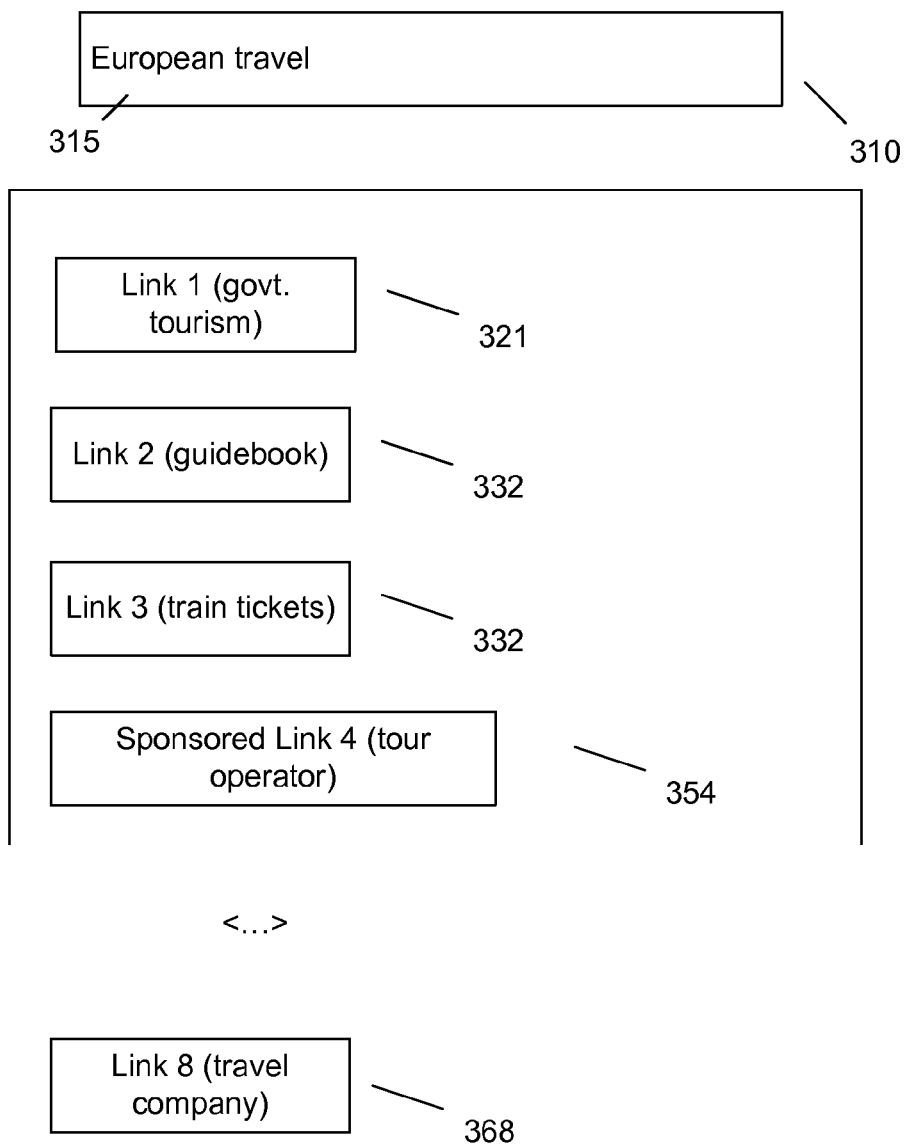

In this prophetic example, a user submits the query "European travel" to a search engine. In response, a search engine results page is displayed that includes 8 or less links or link groups initially. An example of such a results page is shown in FIG. 3. A query box 310 with the query 315 of "European travel" is included at the top of the results page. No link groups (such as category links) are initially included. The first displayed link 321 corresponds to a tourism site run by a group of European countries to promote travel. The second displayed link 332 corresponds to a travel site from a popular guidebook writer. The third link 343 corresponds to a site for purchasing train tickets in Europe. The remaining links correspond to various travel companies or tour operators. Fourth link 354 corresponds to a sponsored link from a tour operator, while the fifth through seventh links (not shown) and the eighth link 368 correspond to other travel companies or tour operators.

Figure 4:
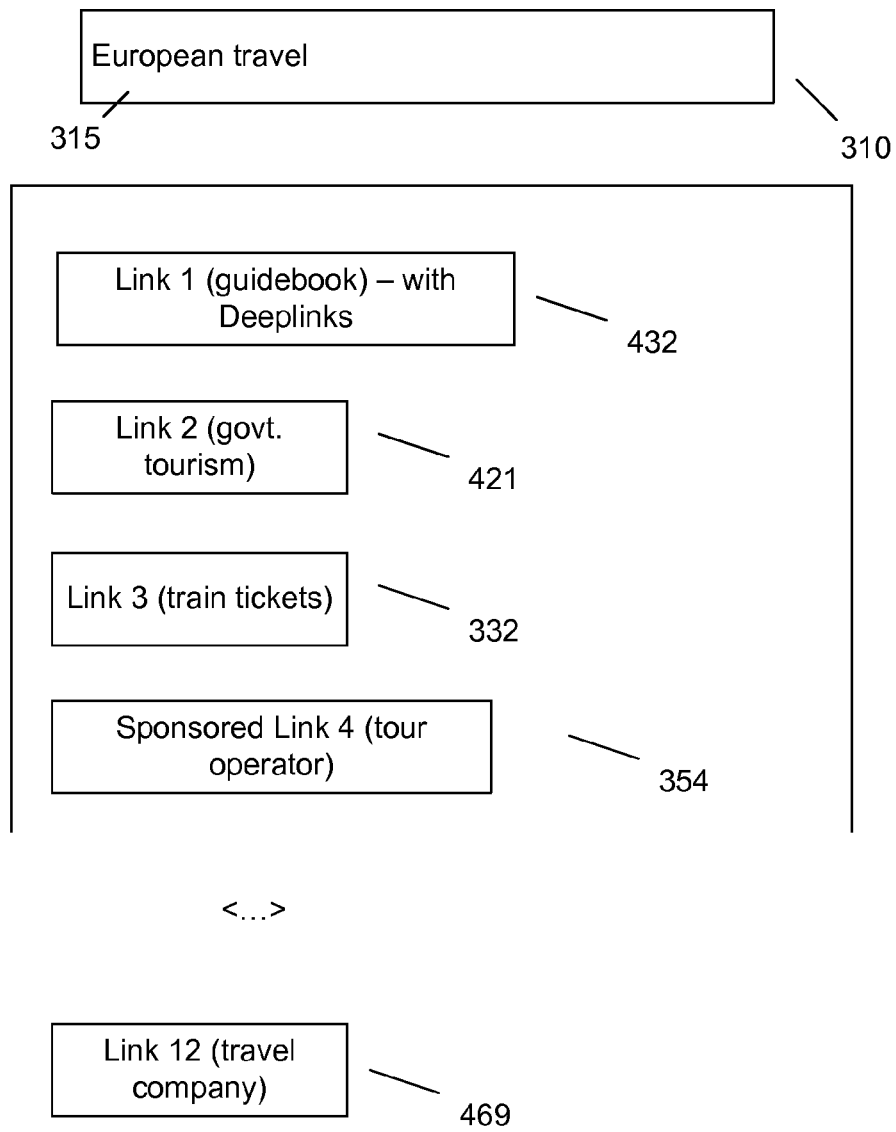

The user selects the first link 321, but views the corresponding page for less than 10 seconds. The user then returns to the results page by traversing the history. A new search is performed using the additional context to create a modified results page as shown in FIG. 4. This results in display of additional results, so that 12 links or link groups are displayed on the results page. The final result shown in FIG. 4 is now link 12, which corresponds to a tour operator or travel company. The order of the first two links is also modified, so that the link for guidebook writer site 432 is now first while the link for government tourism site 421 is second. This is due to the decrease in ranking of the government tourism site based on the user interacting with the site for less than a threshold amount of time. Due to the rise in the order of display for the guidebook site, deeplinks for the guidebook are now also included as part of the link 432 for the guidebook site. In this example, the addition of a new type of result in the form of deeplinks was based on a deeplink appropriate site rising to a sufficient level in the order of display. Alternatively, the addition of a new type of result can be triggered automatically when a user traverses a history and a modified results page is created.

Figure 5:
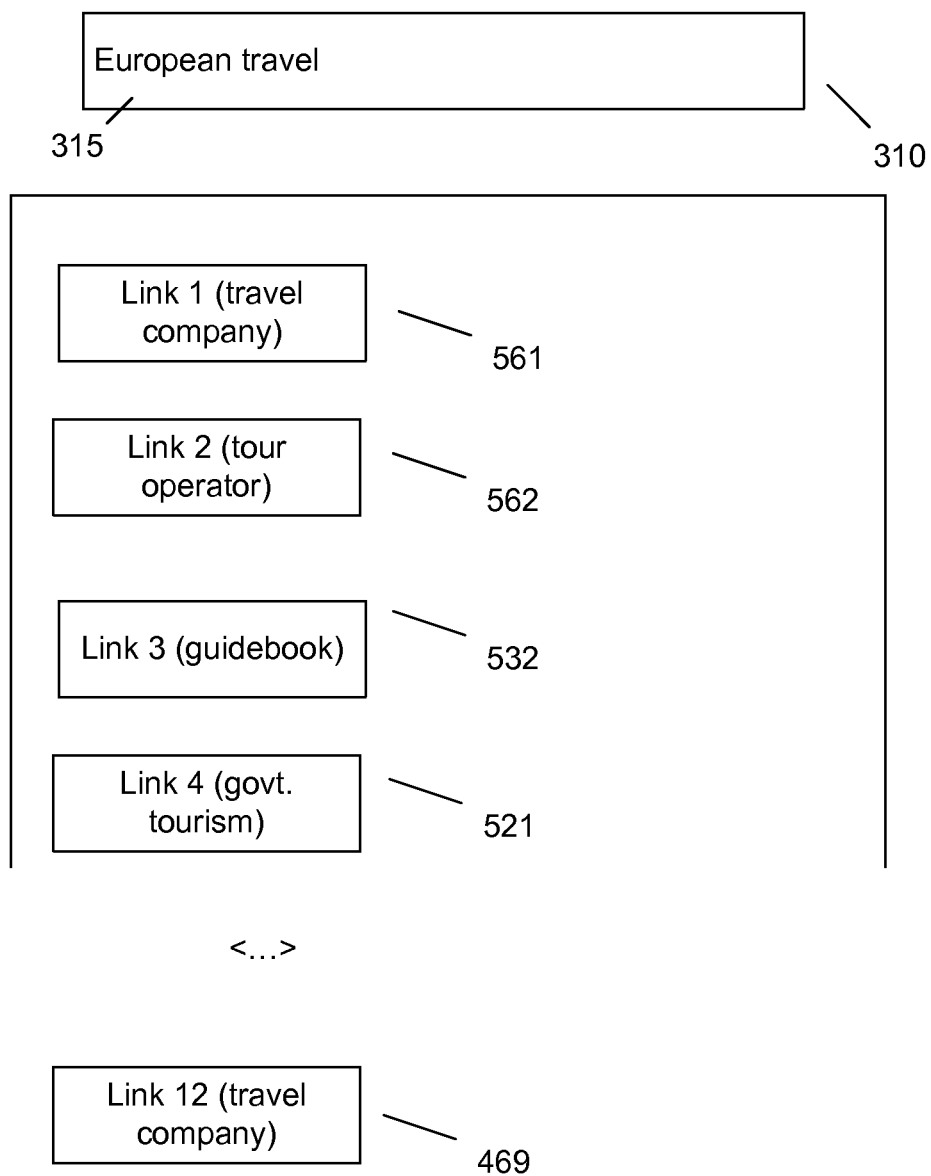

One of the travel company sites is selected next. The user spends more than a threshold amount of time reviewing pages at the company site, such as more than 20 seconds, or more than 45 seconds, or more than 1 minute. The user then traverses the history again to return to the results page. The temporary context now includes both the short viewing time for the government site and the extended viewing time for the travel site. When the query is submitted again, yet another new results page is created as shown in FIG. 5. The results page shown in FIG. 5 also includes 12 links or link groups for display, but the order is modified relative to the results in FIG. 4. In FIG. 5, the viewing of the responsive result corresponding to a travel company results in a temporary context that increases the ranking for all travel companies and tour operators. As a result, the top two results 561 and 562 are now travel companies or tour operators, with the guidebook site link 532 in the third position and the government tourism site link 521 in the fourth position.

Example

Incorporation of Missing Result Types

Figure 12:
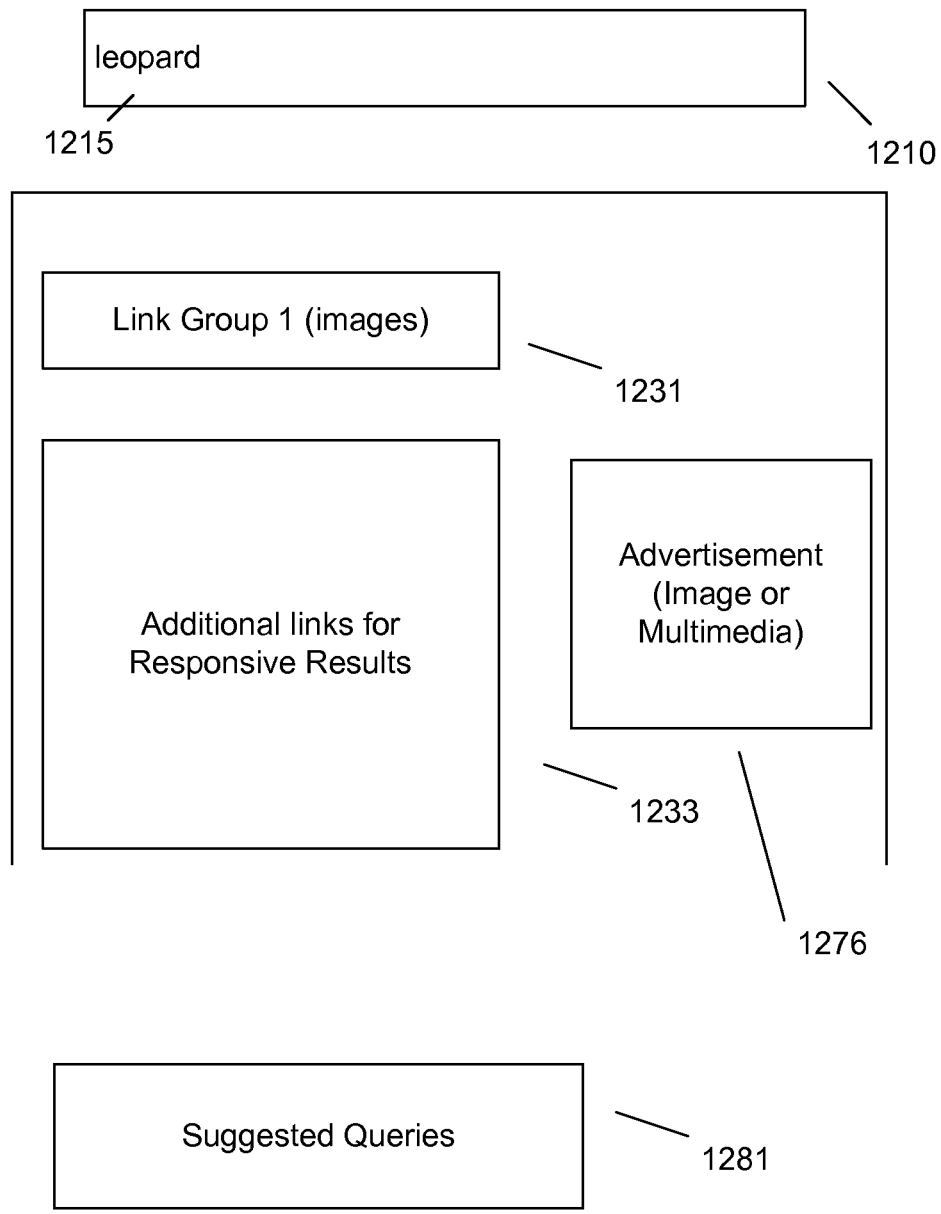
FIGS. 12 to 14 show schematic examples of the display of search engine result pages.

In this prophetic example, a user submits the query "leopard" to a search engine. In response, a search engine results page is displayed that includes 10 or less links or link groups initially. An example of such a results page is shown in FIG. 12. A query box 1210 with the query 1215 of "leopard" is included at the top of the results page. The first displayed link 1231 is actually a link group for image results of leopards. Additional links to responsive results 1233 corresponding to links (link groups) for various types of information or multimedia content about leopards are also included in the listing of links or link groups. The listing of the 10 links or link groups represents the primary responsive content for the results page. In this example, the browser was instructed to wait until this content was available prior to displaying the page.

In this example, three additional content types were processed in parallel for inclusion in the results page. These additional content types included a listing of suggested queries, a listing of sponsored (advertisement) links, and an image or other multimedia display or banner type advertisement. The additional content types had an associated time limit of 300 milliseconds. In this example, the suggested queries and the image/multimedia display advertisement were provided prior to the expiration of the time limit. As a result, the suggested queries were included with the results page as suggested queries 1281 and the image/multimedia display advertisement was provided as advertisement 1276. The sponsored links, however, were not available within the time limit. As a result, the results page was delivered to the browser for display without the sponsored link content. Optionally, the failure to include an additional content type can cause the page to be identified as a page where the cached version is not served, such as by sending the page to the browser with the "no-cache" directive.

Figure 13:
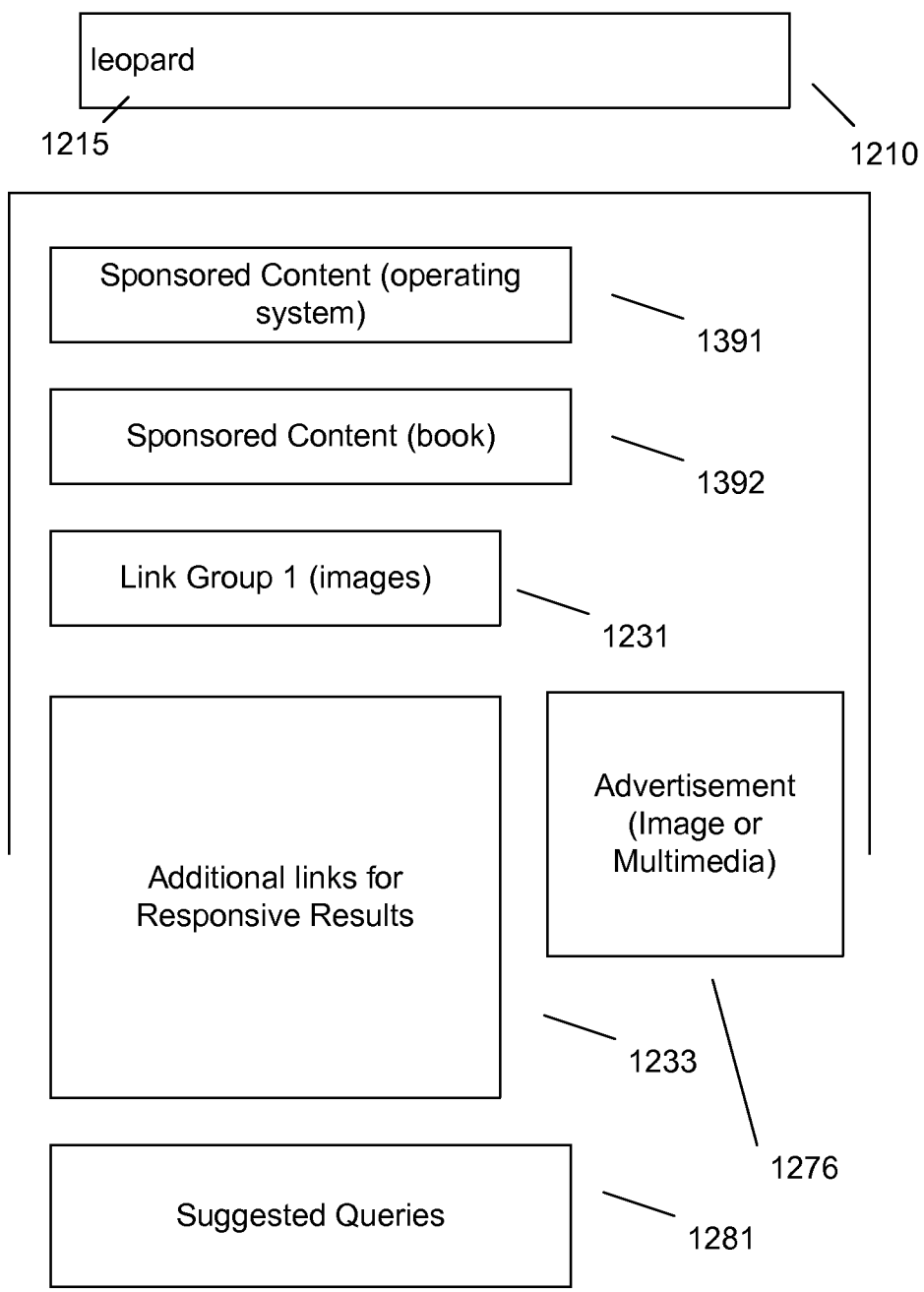

After the initial results page schematically shown in FIG. 12 is displayed, the user leaves the initial results page, either by clicking on a link or submitting a different query. The user then uses the Back button or enters the query "leopard" again to return to the initial results page. This results in the query being submitted to the search engine again. Due to the previous query, the information related to serving the search engine results page for "leopard" is readily available to the search engine (such as being stored in a local cache), so on the second attempt the sponsored links are provided before the expiration of the time limit. This allows a page corresponding to FIG. 13 to be displayed to the user. The primary content of links and the suggested queries in FIG. 13 are the same as the corresponding content in FIG. 12. However, sponsored advertisement content 1391 for an operating system and sponsored advertisement content 1392 for a book with leopard in the title is now added at the top of the page.

Figure 14:
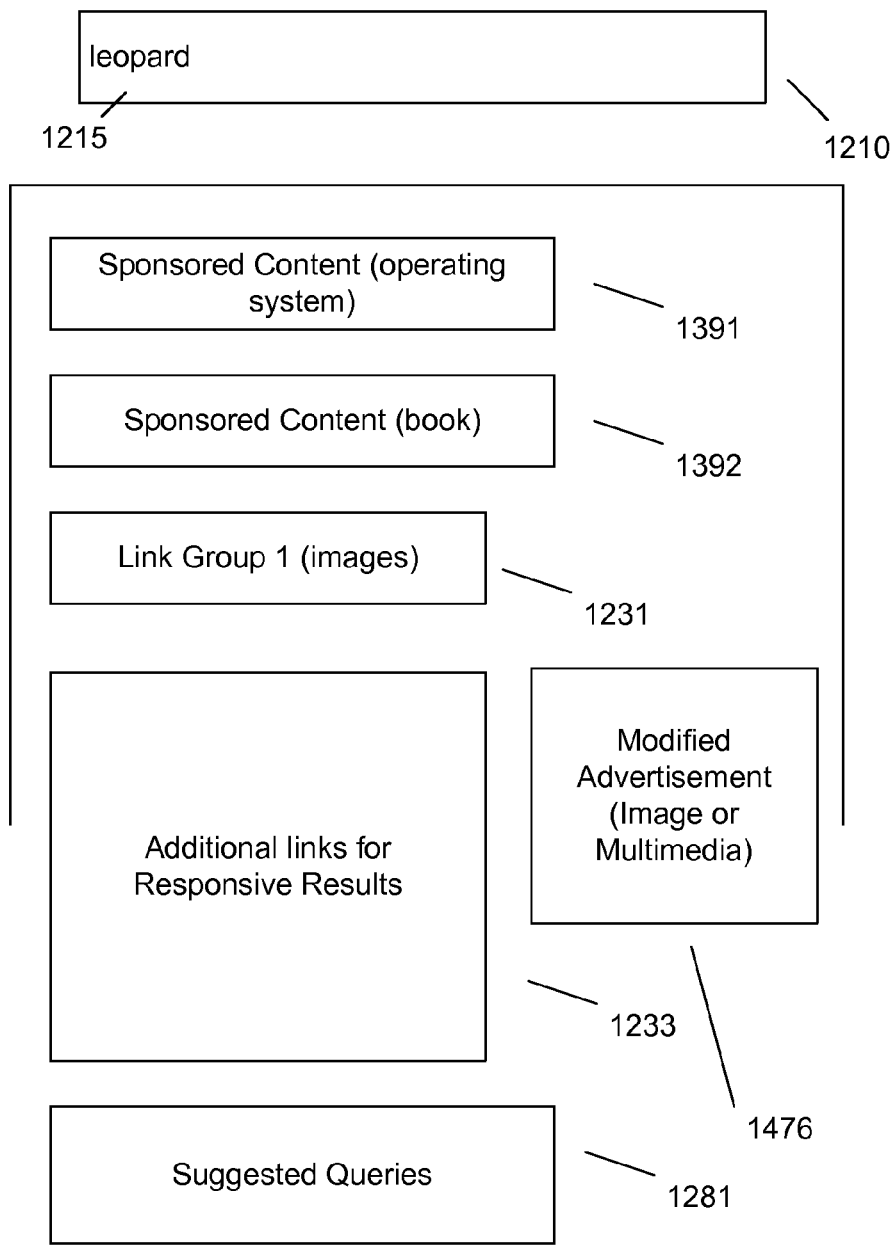

In another example, consider again a situation where the user is presented with a results page such as either the one shown in FIG. 12 or the one shown in FIG. 13. In this example, the user's first interaction with the page is to click on or otherwise select the display advertisement 1276. Selection of the display advertisement 1276 may change the page displayed in the browser. Alternatively, if selection of the display advertisement 1276 generates a new window, the user can leave the display page for another reason, such as selecting another link. When the user returns to the results page, the user's interaction with the advertisement can be used as additional context in providing a modified results page as shown in FIG. 14. For example, if the user selects the display advertisement 1276 and views the resulting ad for a sufficient period of time, modified advertisement 1476 may be similar to the initial display advertisement 1276. On the other hand, if the user exhibits a "quickback" behavior or otherwise provides an indication that the advertisement has low relevance, a different type of advertisement can be selected.

In still another example, an alternative basis for generating a results page such as the page shown in FIG. 14 can be based on spending additional time generating content for the additional content types. As noted above, when a page is displayed that contains both primary content and additional content types, a limited amount of time is provided for generation of the additional content types, such as 300 milliseconds or less. This constrained time period limits the options available for generating the additional content type. However, when a user leaves a page that is currently being viewed, there is a reasonable likelihood that the user will return to the page. In preparation for return to the page, after a page with both primary and additional content types is displayed, a secondary process for generation of one or more of the additional content types can be started. This secondary process for generation of additional content types can be used to perform a more thorough search for content appropriate to the additional content type, such as by using an algorithm that would not be suitable for generating content in less than 1 second. Advertisement content is an example of content where an extended period of time, such as having up to 20 seconds, could allow for identification of more relevant content by using a more complicated algorithm. Alternatively, having a longer time period could allow a different type of auction for the available advertising impression to be conducted for the content, so that a more complicated bidding process could be used for placing an advertisement.

With regard to the results pages shown in the figures, FIG. 12 (or FIG. 13) could be used as a starting page for this type of example. In this type of example, the initial generation of the additional content types of sponsored links, query suggestions, and display advertising is performed within a time threshold of less than 300 milliseconds. After the initial display of the results page in FIG. 12 (or FIG. 13), at least one of the content types can be selected for a secondary content generation process. In this example, the display advertising is selected for second content generation. The secondary content generation can be initiated as soon as the results page is displayed, or the secondary content generation can be started after the user leaves the results page while keeping the browser open. The secondary content generation process is then used to generate a more appropriate advertisement for the results page. The process can use a longer time period, such as 10 seconds or less, or 20 seconds or less, or 30 seconds or less to generate the more appropriate advertising content. When the user returns to the results page, a page corresponding to FIG. 14 can be displayed, where a modified advertisement 1476 is displayed based on the advertising content generated during the secondary content generation process.

Additional Examples

Having briefly described an overview of various embodiments of the invention, an exemplary operating environment suitable for performing the invention is now described. Referring to the drawings in general, and initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Figure 6:
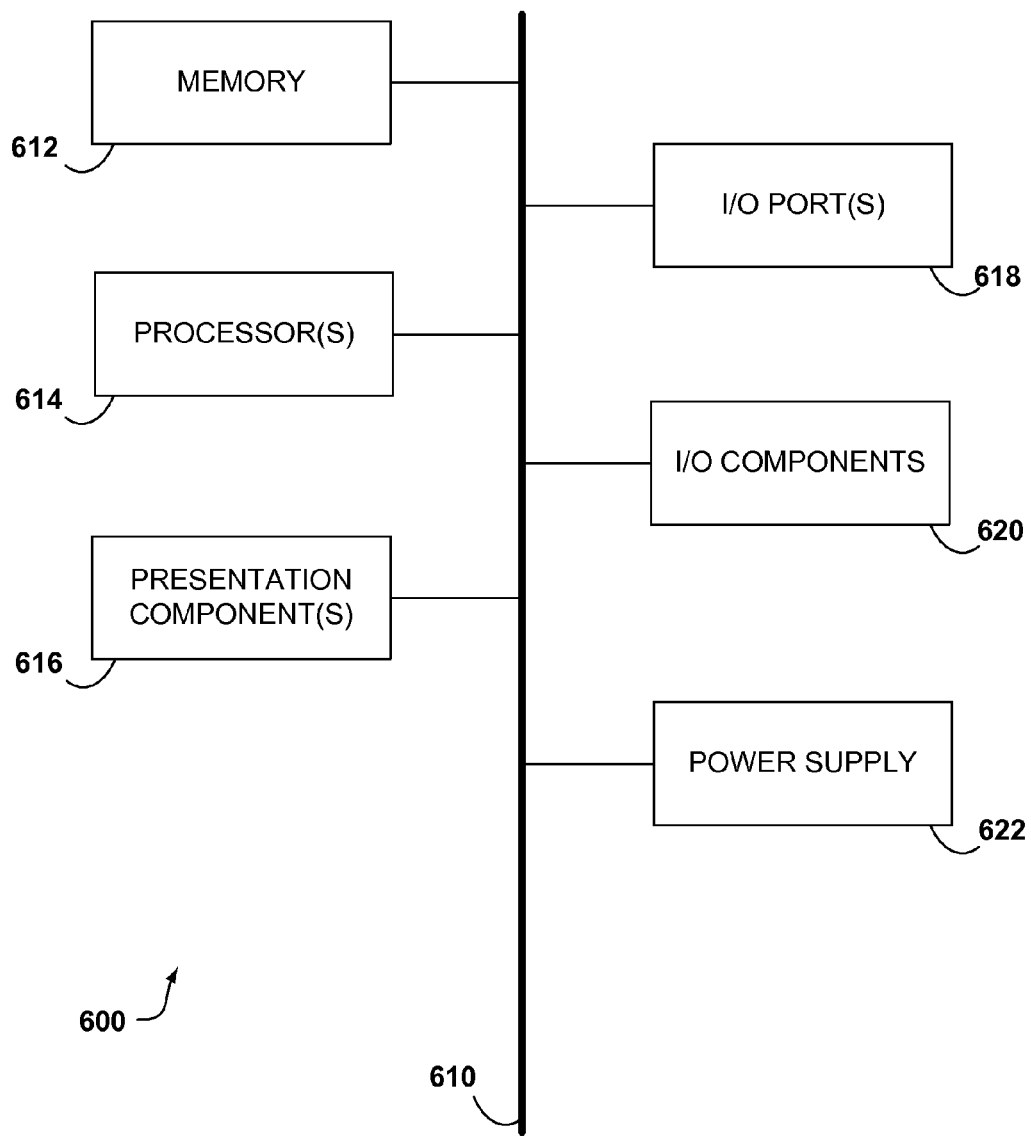
FIG. 6 is a block diagram of an exemplary computing device suitable for implementing embodiments described herein.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

The computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 600. In an embodiment, the computer storage media can be selected from tangible computer storage media. In another embodiment, the computer storage media can be selected from non-transitory computer storage media.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 612 can include computer-storage media in the form of volatile and/or nonvolatile memory. The memory may be removable, non-removable, or a combination thereof. Exemplary hardware devices include solid-state memory, hard drives, optical-disc drives, etc. The computing device 600 includes one or more processors that read data from various entities such as the memory 612 or the I/O components 620. The presentation component(s) 616 present data indications to a user or other device. Exemplary presentation components include a display device, speaker, printing component, vibrating component, and the like.

The I/O ports 618 can allow the computing device 600 to be logically coupled to other devices including the I/O components 620, some of which may be built in. Illustrative components can include a microphone, joystick, game pad, satellite dish, scanner, printer, wireless device, etc.

Figure 7:
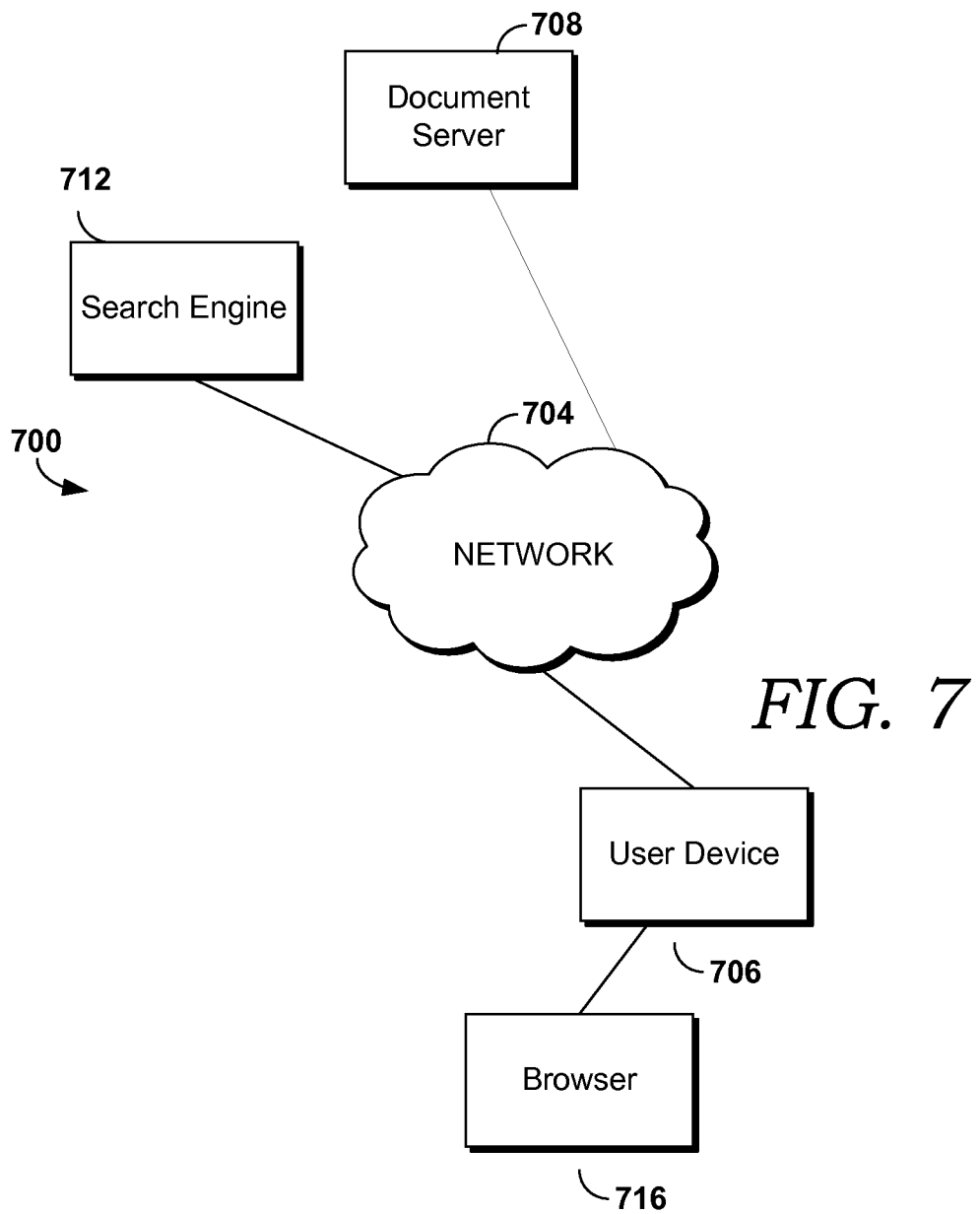
FIG. 7 is a block diagram of an exemplary system architecture of a distributed computing environment configured for use in implementing embodiments described herein.

With additional reference to FIG. 7, a block diagram depicting an exemplary network environment 700 suitable for use in embodiments of the invention is described. The environment 700 is but one example of an environment that can be used in embodiments of the invention and may include any number of components in a wide variety of configurations. The description of the environment 700 provided herein is for illustrative purposes and is not intended to limit configurations of environments in which embodiments of the invention can be implemented.

The environment 700 includes a network 704, a user device 706, a document server 708 and a search engine 712. The network 704 includes any computer network such as, for example and not limitation, the Internet, an intranet, private and public local networks, and wireless data or telephone networks. The user device 706 can be any computing device, such as the computing device 600, from which a search query can be provided. For example, the user device 706 might be a personal computer, a laptop, a server computer, a wireless phone or device, a personal digital assistant (PDA), or a digital camera, among others. In an embodiment, a plurality of user devices 706, such as thousands or millions of user devices 706, can be connected to the network 704. A user can use a browser 716 on user device 706 to interact with results pages generated by search engine 712. The search engine 712 includes any computing device, such as the computing device 600, and provides functionalities for a content-based search engine. Document server 708 represents any type of computer device that can provide documents selected by a user based on results responsive to a search query.

Figure 8:
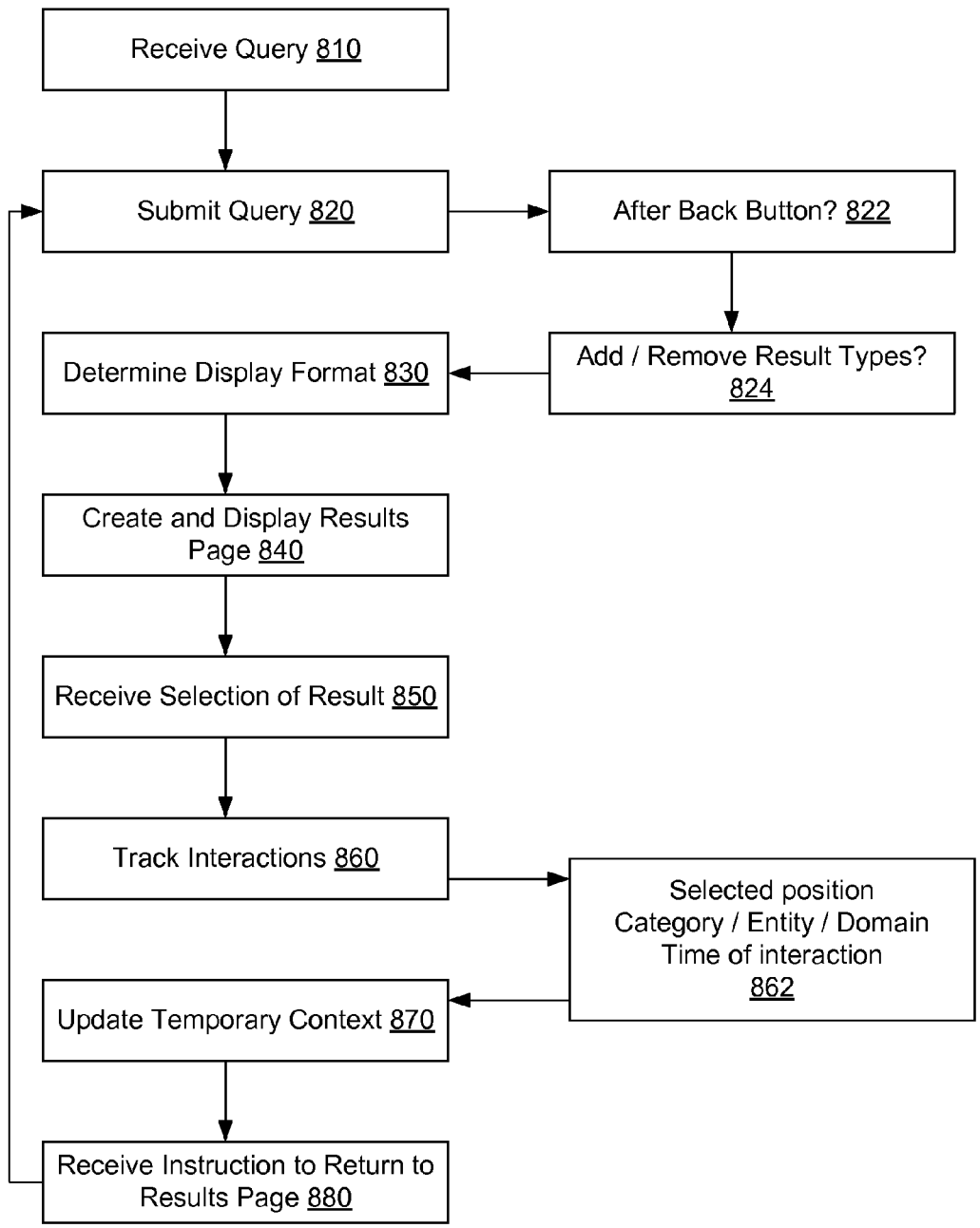
FIG. 8 is a process flow diagram for providing search engine result pages to a user.

FIG. 8 shows an example of a process flow for providing a search engine results page. In FIG. 8, a query is received 810, such as a query entered by a user into a search query box. The query is submitted to a search engine 820. When the query is submitted, the search engine can be provided with information 822 regarding whether the query is new, or whether the query is being submitted in response to a Back button or another mechanism for returning to a results page. If the user is visiting a previously displayed results page, a determination can be made 824 regarding whether more or fewer types of results should be displayed when the modified results page is created. Alternatively, determining the types of results to display can be included as part of determining 830 the display format. Determining the display format can also include determining the number of responsive results to display on a results page. A search engine results page is then created 840 and displayed to the user. A selection of a link corresponding to a responsive result is received 850. The user's interactions with the results page and/or the responsive result can be tracked 860, such as by tracking 862 the position of the received selection on the results page, the category and/or entity and/or domain associated with the selected result, and the interaction time with the selected result. The tracked interactions can be used to update 870 the temporary context. When the Back button is used 880 to return to the results page, the updated temporary context can be used when the query is submitted again to create another modified search engine results page. As shown by the arrow indicating a loop, this process can be repeated, so that a third results page (or still other additional results pages) can be created as the user continues to traverse the history to return to the history entry for the initial results page.

Figure 9:
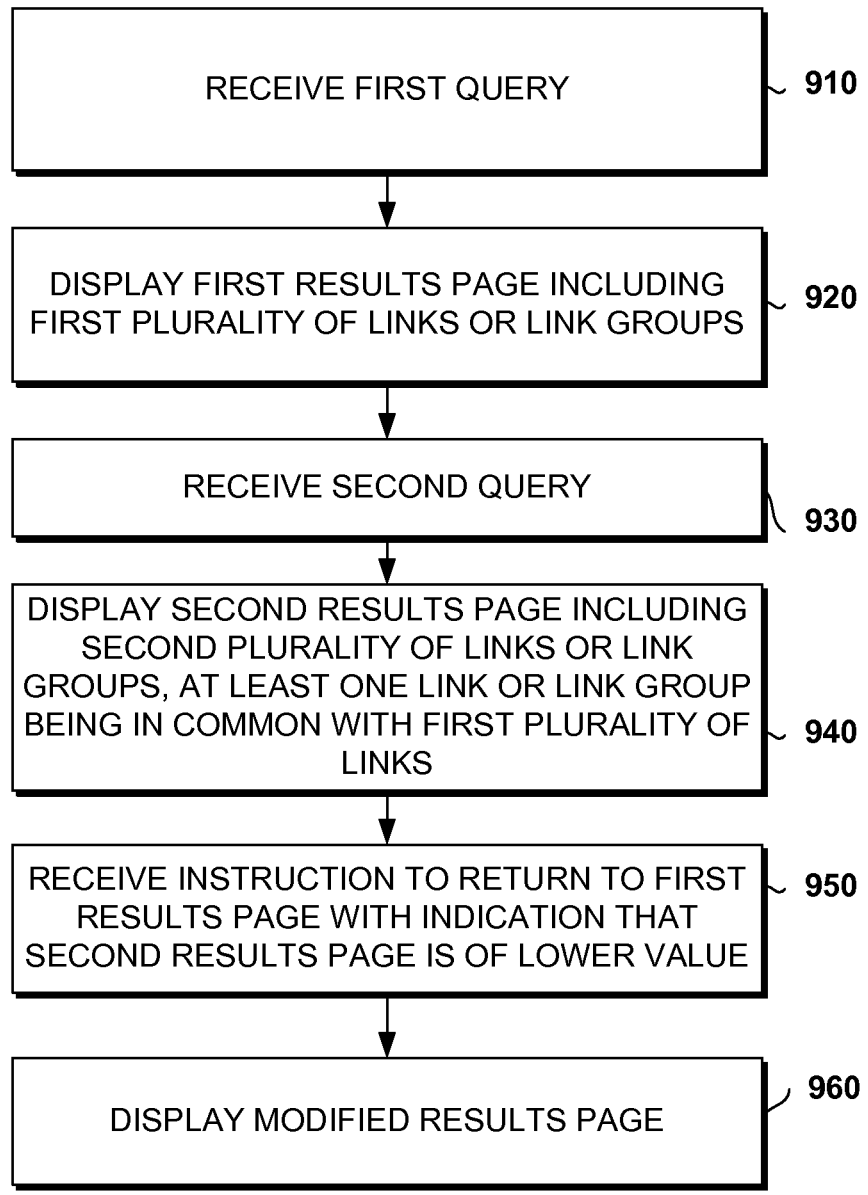
FIGS. 9 to 11 are process flows for various methods of providing search results.

FIG. 9 schematically shows an example of a process flow according to the invention. In FIG. 9, a first query is received 910. This causes a first results page to be displayed 920. In the example shown in FIG. 9, the first results page can include a first plurality of links or link groups corresponding to responsive results. The first plurality of links or link groups can be displayed, for example, in an order based on a ranking of the responsive results. Optionally, the first results page can also include other result types. A second query is then received 930. The second query can be received without the user interacting with the first results page, or the second query can be received after one or more interactions. A second results page is then display 940. The second results page includes a second plurality of links or link groups. At least one link or link group displayed in the second plurality of links or link groups is in common with links or link groups displayed in the first plurality of links or link groups. In other words, at least one link (or link group) is the same between the first plurality of links and the second plurality of links. An instruction is then received 950 to return to the first results page. This instruction includes an indication that the second results page is of lower value than the first results page. For example, the instruction to return to the first results page can be a "quickback", where a user uses the Back button to return to the first results page in less than a threshold period of time, such as in less than 10 seconds or less than 20 seconds. Another option is that the user submits the first query again in less than the quickback period of time. Still another option is that the instruction to return to the first results page is received without detecting a user interaction with a result on the second results page. Based on the instruction, a modified version of the first results page is displayed 960 to the user. The modified results page can include a condensed link for links that are in common between the first and second pluralities of results, or the order of display of common links can be modified, or another modification can be made.

Figure 10:
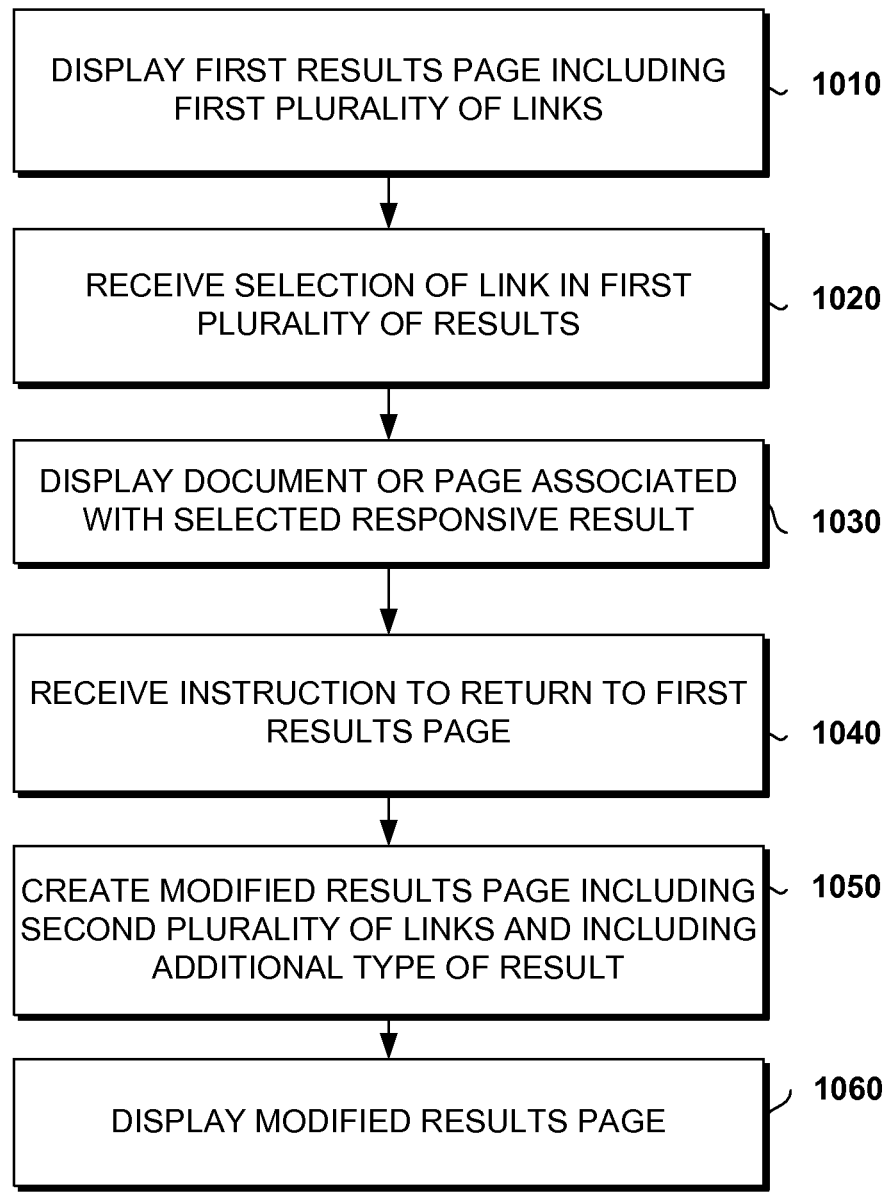

FIG. 10 schematically shows another example of a process flow according to the invention. In FIG. 10, a first results page is displayed 1010 that is responsive to a search query during a browsing session. In the example shown in FIG. 10, the first results page can include a first plurality of links corresponding to responsive results. The first plurality of links or link groups can be displayed in an order based on a ranking of the responsive results. Optionally, such as when the search query is a navigational query, the first plurality of links can include a reduced number of links, such as 5 links or less. A selection of a link or link group corresponding to a responsive result is received 1020. Optionally, the selected link or link group has a lower ranking than at least one other responsive result. Optionally, the selected link can have a lower ranking than a plurality of other responsive results. In the example shown in FIG. 10, the selection is preferably the first selection of a link or link group from the first results page. In other words, the user has not previously viewed the responsive results shown in the first results page and then returned to the first results page by traversing the history of the browsing session. The document or page associated with the selected responsive result is displayed 1030. The user can interact with this selected responsive result for any convenient amount of time, and the user's interactions can be tracked. An instruction is then received 1040 to return to the first results page. A modified results page including a second plurality of links or link groups corresponding to responsive results is then created 1050. The second plurality of links can include at least 10 links or link groups and also includes at least one additional result type, such as a suggested query, a deeplink, a multimedia result, a sponsored result, or a link group (category result). The modified results page is then displayed 1060 for viewing by the user.

Figure 11:
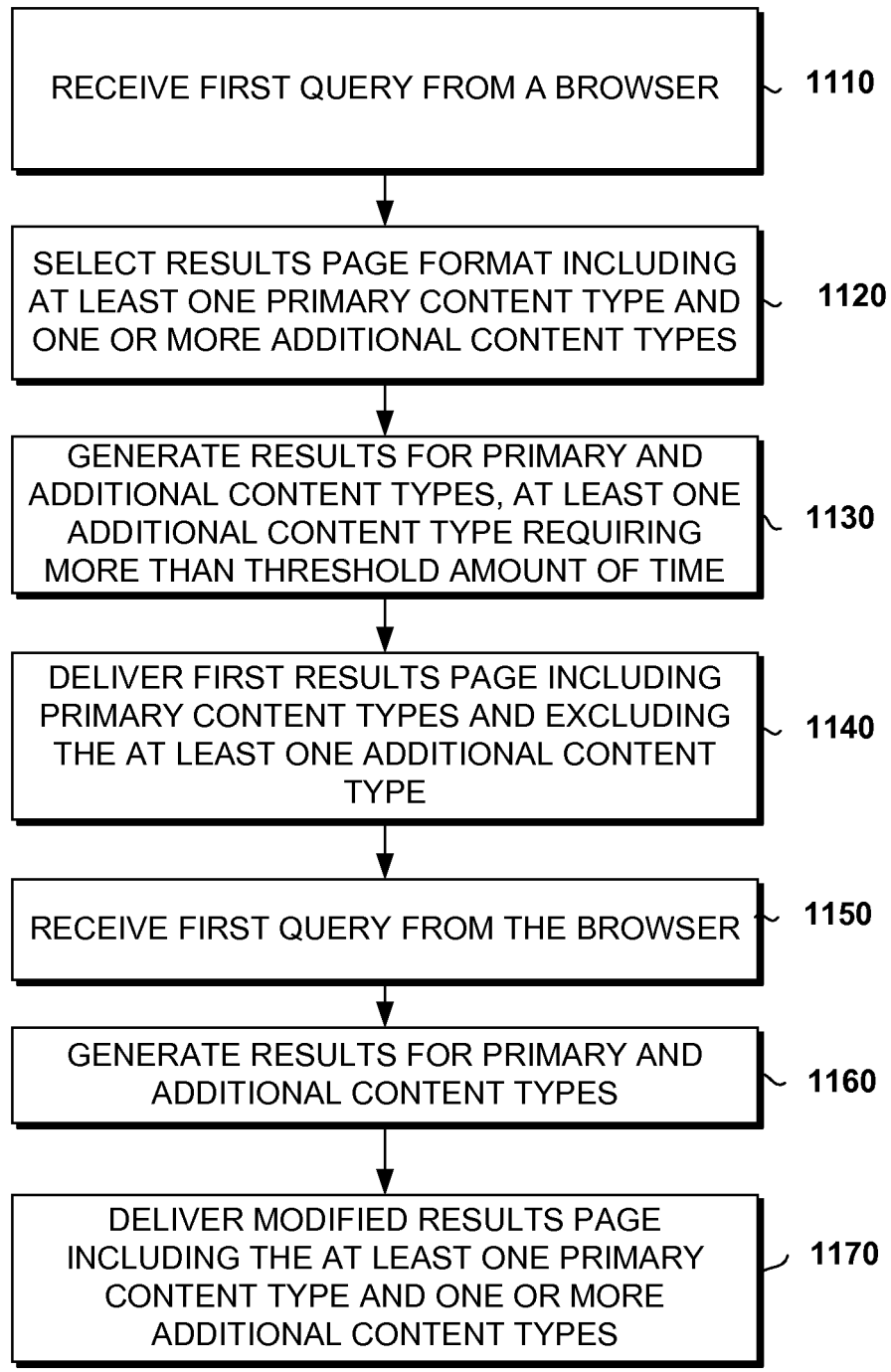

FIG. 11 schematically shows another example of a process flow according to the invention. In FIG. 11, a first query is received 1110 from a browser. A results page format is selected 1120 based on the first query. The results page format includes at least one primary content type and one or more additional content types. Results are then generated 1130 for the at least one primary content type and the one or more additional content types. However, the results for at least one of the one or more additional content types in this example require more than a threshold amount of time to generate. As a result, a first results page is delivered 1140 to the browser than includes the at least one primary content type but that excludes the at least one additional content type that required too much time to generate. The first query is then received 1150 again from the browser. The results for the primary and additional content types are generated again 1160. This time, all of the content types are generated within the threshold time, so that a modified results page is delivered 1170 to the browser than includes the at least one primary content type and the one or more additional content types.

In an embodiment, a method for providing search results is provided. The method includes receiving a first query; displaying a first results page corresponding to the first query, the first results page including a first plurality of links or link groups corresponding to responsive results; receiving a second query; displaying a second results page corresponding to the second query, the second results page including a second plurality of links or link groups, at least one link or link group being in common between the first plurality of links or link groups and the second plurality of links or link groups; receiving an instruction to return to the first results page, the received instruction providing an indication that the second results page is of lower value than the first results page; and displaying a modified results page, the display of the at least one common link or link group being modified relative to the first results page.

In another embodiment, a method is provided for providing search results. The method includes displaying a first results page that is responsive to a search query during a browsing session, the first results page including a first plurality of links comprising 10 or less links or link groups, the first plurality of links corresponding to responsive results and being displayed in an order based on a ranking of the responsive results; receiving a selection of a link or link group corresponding to a responsive result having a lower ranking than at least one other responsive result, the selection being the first selection of a link or link group from the first results page; displaying a document or page associated with the selected responsive result; receiving an instruction to return to the first results page; creating a modified results page comprising a second plurality of links or link groups corresponding to responsive results and at least one additional result type relative to the first results page, the second plurality of links or link groups comprising at least about 10 links or link groups, the at least one additional result type being selected from suggested queries, deeplinks, link groups, multimedia results, condensed link representations, or sponsored results; and displaying the modified results page.

In still another embodiment, a method is provided for displaying a page including multiple content types, comprising: receiving a first query from a browser; selecting a results page format including at least one primary content type and one or more additional content types; generating results for the at least one primary content type and the one or more additional content types corresponding to the selected format, at least one of the one or more additional content types requiring more than a threshold amount of time for generation; delivering a first results page including the at least one primary content type and excluding the at least one additional content type; receiving the first query from the browser; generating results for the at least one primary content type and the one or more additional content types corresponding to the selected format; and delivering a modified results page including the at least one primary content type and including the one or more additional content types.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A system for providing search results, comprising:
a processor and an associated memory, the associated memory containing computer-executable instructions, the processor executing the computer-executable instructions to provide a method comprising:
receiving a first query;
displaying a first results page corresponding to the first query, the first results page including a first plurality of links or link groups corresponding to responsive results;
receiving a second query;
displaying a second results page corresponding to the second query, the second results page including a second plurality of links or link groups, at least one link or link group being in common between the first plurality of links or link groups and the second plurality of links or link groups;
receiving an instruction to return to the first results page, the received instruction providing an indication that the second results page is of lower value than the first results page; and
displaying a modified results page, the display of the at least one common link or link group being modified relative to the first results page,
wherein the indication that the second results page is of lower value than the first results page comprises receiving the instruction to return to the first results page prior to receiving a selection of a result on the second results page.

2. The system of claim 1, wherein the display of the at least one common link or link group is modified relative to the first results page due to a different display order for the at least one common link or link group.

3. The system of claim 1, wherein the modified results page displays a condensed link representation corresponding to the at least one common link or link group.

4. The system of claim 1, wherein receiving the instruction to return to the first results page comprises receiving selection of a Back button in a browser interface.

5. The system of claim 1, wherein receiving the instruction to return to the first results page comprises receiving the first query after displaying the second results page.

6. The system of claim 1, wherein the indication that the second results page is of lower value than the first results page comprises receiving the instruction to return to the first results page within a period of time corresponding to a quickback period.

7. The system of claim 1, wherein the modified results page further comprises at least one additional content type with content generated during a secondary content generation process.

8. A computer-implemented method for providing search results, comprising:

displaying a first results page that is responsive to a search query during a browsing session, the first results page including a first plurality of links comprising 10 or less links or link groups, the first plurality of links corresponding to responsive results and being displayed in an order based on a ranking of the responsive results;

receiving a selection of a link or link group corresponding to a responsive result having a lower ranking than at least one other responsive result, the selection being the first selection of a link or link group from the first results page;

displaying a document or page associated with the selected responsive result;

receiving an instruction to return to the first results page;

creating a modified results page comprising a second plurality of links or link groups corresponding to responsive results and at least one additional result type relative to the first results page, the second plurality of links or link groups comprising at least about 10 links or link groups, the at least one additional result type being selected from suggested queries, deeplinks, multimedia results, condensed link representations, or sponsored results; and displaying the modified results page.

9. The computer-implemented method of claim 8, wherein the modified results page further comprises at least one additional content type with content generated during a secondary content generation process.

10. The computer-implemented method of claim 8, wherein the first plurality of links comprises 5 or less links or link groups.

11. The computer-implemented method of claim 10, wherein the modified results page includes a plurality of additional result types.

12. The computer-implemented method of claim 8, wherein the selected link or link group has a lower ranking than a plurality of other responsive results, and wherein the modified results page comprises a condensed link representation as an additional result type, the condensed link representation corresponding to the plurality of other responsive results.

13. The computer-implemented method of claim 12, wherein two or more links included in the first plurality of results are included in the second plurality of results, the two or more links being displayed in the same order in the first plurality of links and the second plurality of links.

14. The computer-implemented method of claim 8, wherein creating a modified results page comprises submitting the search query to the search engine after receiving the instruction to return to the first results page.

15. The computer-implemented method of claim 8, wherein the instruction to return to the first results page comprises use of the Back button.

16. A computer-implemented method for displaying a page including multiple content types, comprising:

receiving a first query from a browser;

selecting a results page format including at least one primary content type and one or more additional content types;

generating results for the at least one primary content type and the one or more additional content types corresponding to the selected format, at least one of the one or more additional content types requiring more than a threshold amount of time for generation;

delivering a first results page including the at least one primary content type and excluding the at least one additional content type;

receiving the first query from the browser;

generating results for the at least one primary content type and the one or more additional content types corresponding to the selected format; and delivering a modified results page including the at least one primary content type and including the one or more additional content types.

17. The computer-implemented method of claim 16, wherein the at least one additional content type is a sponsored result.

18. The computer-implemented method of claim 16, further comprising identifying the first results page as not matching the selected format.

19. The computer-implemented method of claim 18, wherein the first results page is identified as not matching the selected format by delivering the first results page with a no-cache directive.

20. The computer-implemented method of claim 16, wherein the modified results page further comprises at least one additional content type with content generated during a secondary content generation process.

\* \* \* \* \*